(12) United States Patent
Thompson et al.

(10) Patent No.: US 11,733,342 B2
(45) Date of Patent: Aug. 22, 2023

(54) MOBILE-BASED POSITIONING USING ASSISTANCE DATA PROVIDED BY ONBOARD MICRO-BSA

(71) Applicant: PHY Wireless, LLC, San Diego, CA (US)

(72) Inventors: Steven C. Thompson, Solana Beach, CA (US); Raphael Mall, San Diego, CA (US); Neal Riedel, Carlsbad, CA (US); Steven J. Caliguri, San Diego, CA (US); Zane Rau, San Diego, CA (US)

(73) Assignee: PHY Wireless, LLC, San Diego, CA (US)

( * ) Notice: Subject to any disclaimer, the term of this patent is extended or adjusted under 35 U.S.C. 154(b) by 202 days.

(21) Appl. No.: 17/380,989

(22) Filed: Jul. 20, 2021

(65) Prior Publication Data

US 2022/0334214 A1    Oct. 20, 2022

Related U.S. Application Data

(63) Continuation of application No. 17/227,212, filed on Apr. 9, 2021.

(60) Provisional application No. 63/173,239, filed on Apr. 9, 2021.

(51) Int. Cl.
| | | |
|---|---|---|
| *G01S 5/02* | (2010.01) | |
| *H04B 17/327* | (2015.01) | |
| *H04W 64/00* | (2009.01) | |
| *G01C 21/00* | (2006.01) | |
| *G06F 18/2415* | (2023.01) | |
| *G06F 18/2134* | (2023.01) | |

(52) U.S. Cl.
CPC ........ *G01S 5/0246* (2020.05); *G01C 21/3815* (2020.08); *G01S 5/0236* (2013.01); *G01S 5/0244* (2020.05); *G01S 5/0257* (2013.01); *G01S 5/0284* (2013.01); *G01S 5/02524* (2020.05); *G06F 18/21342* (2023.01); *G06F 18/2415* (2023.01); *H04B 17/327* (2015.01); *H04W 64/003* (2013.01)

(58) Field of Classification Search
CPC .... G01S 5/0246; G01S 5/0236; G01S 5/0244; G01S 5/02524; G01S 5/0257; G01S 5/0284; G01S 5/0278; G01S 5/10; G01C 21/3815; G06F 18/21342; G06F 18/2415; H04B 17/327; H04W 64/003
See application file for complete search history.

(56) References Cited

U.S. PATENT DOCUMENTS

2013/0324163 A1*  12/2013  Werner ................ G01S 5/0236
                                                              455/456.6

* cited by examiner

*Primary Examiner* — Umair Ahsan
(74) *Attorney, Agent, or Firm* — Paradice & Li LLP

(57) ABSTRACT

A method for estimating position of a mobile device which includes receiving, from a network server, observed time difference of arrival (OTDOA) assistance data for a first plurality of cells from a base station almanac (BSA) accessible to the network server. The OTDOA assistance data is stored, within a memory of the mobile device, as a first micro-BSA. A position estimate for the mobile device is determined based upon time difference of arrival (TDOA) measurements associated with an initial subset of the first plurality of cells and initial OTDOA assistance data corresponding to the initial subset of the first plurality of cells. The initial OTDOA assistance data may be generated by the micro-BSA based upon an initial seed estimate.

14 Claims, 19 Drawing Sheets

MOBILE-BASED POSITIONING USING ASSISTANCE DATA PROVIDED BY ONBOARD MICRO-BSA

CROSS REFERENCE TO RELATED APPLICATIONS

This application is a continuation of U.S. patent application Ser. No. 17/227,212, filed Apr. 9, 2021, which claims priority to and the benefit of U.S. Provisional Patent Application No. 63/007,846, entitled MOBILE-BASED POSITIONING USING ASSISTANCE DATA PROVIDED BY ONBOARD MICRO-BSA, filed on Apr. 9, 2020, and of U.S. Provisional Patent Application No. 63/173,239, entitled MOBILE-BASED POSITIONING USING MEASUREMENTS OF RECEIVED SIGNAL POWER AND TIMING, filed on Apr. 9, 2021, the disclosures of which are incorporated herein by reference in their entirety for all purposes.

FIELD

The present disclosure relates to a system and method for determining position of a user terminal or other communication equipment based on time of arrival measurements in a wireless environment.

BACKGROUND

Measurements of times of arrival (TOA) for signals from a set of wireless base stations can aid in determining a user's position or location. For example, existing standards enable wireless devices to determine their location or positioning based on signals from base stations in a way that can replace or supplement GPS or WiFi-assisted positioning strategies. See, for example, 3GPP TS 36.133, "Requirements for support of radio resource management", V15.5.0.

The state-of-the-art in downlink cellular positioning of a wireless device (also referred to as a "user equipment" or "UE") is UE-assisted (UE-A). In the UE-A approach a location server provides assistance data to nearby cells (also known as base stations, eNBs for 4G LTE, gNBs for 5G NR), which communicates this to a UE. The UE performs measurements on the current downlink radio conditions (i.e., power, timing measurements) and transmits these measurements in the uplink back to the location server. The location server then uses the measurements to estimate the location of the UE.

An example positioning method is OTDOA (observed time difference of arrival) where the UE performs TDOA (also known as RSTD in 3GPP) measurements and the location server performs a hyperbolic TDOA position calculation. Another positioning method is enhanced cell ID (E-CID) where the UE performs power measurements of surrounding cells and roundtrip timing estimates of the UE serving cell. Release 9 3GPP E-CID also incorporates angle-of-arrival (AoA) measurements at the eNB. The most basic cellular positioning method is basic cell ID where the position is estimated at the centroid of the serving cell, or at the serving cell transmission point.

Along with the UE measurements, the location server has the additional information needed to estimate the UE location. This additional information includes cell location, cell transmission power, relative cell timing offsets, antenna direction and aperture details, etc.

The LTE positioning protocol (LPP), described for example in 3GPP TS 36.355 version 13.3.0, which is referenced in release 13 of the 3GPP LTE specification, provides for UE-A positioning. For example, in accordance with the LTE positioning protocol, positioning reference signal (PRS) subframes are embedded into designated orthogonal frequency division multiplexing (OFDM) symbols over specified time intervals, sometimes called positioning occasions. The UE may measure the time of arrival (TOA) of PRS subframes from each accessible base station (which the 3GPP LTE specification calls the eNodeB). The user equipment preferably measures at least one reference signal time difference (RSTD) between two different eNodeBs (one called the reference and the other called the neighbor). The reference signal time difference is related to the established measure for observed time difference of arrival (OTDOA) described in the LTE positioning protocol.

Determining the position of user equipment proceeds by measuring the TOA of the first reference signal path from each eNodeB of interest followed by determining the reference signal time difference (RSTD) between pairs of designated eNodeB base stations using the respectively measured times of arrival at the user equipment. Depending on the particular configurations specified in the standard, the TOA and RSTD measurements may be made over a specified number of base stations and different corresponding combinations of RSTD measurements between ones of the set of base stations.

LTE's fundamental modulation scheme to transmit bits over the air uses OFDM. That is, bits are generated by applying quadrature amplitude modulation (QAM) to each active subcarrier that makes up an OFDM symbol. In practice, an LTE OFDM symbol may have 2048 time samples representing 600 active subcarriers out of a maximum of 1200 subcarriers. Each subcarrier may be assigned a function at the receiver, such as transmitting bits known a priori to the receiver and thus enabling different calculations. These calculations may include channel impulse response (CIR) estimation and positioning-related measurements.

FIG. 1 provides a functional block diagram of apparatus for determining position using observed time difference of arrival (OTDOA) based on the reference signal time difference (RSTD) measurement specified in LTE. The illustrated user equipment receiver 110 receives a plurality of OFDM symbols from two base stations 101, 103. Receiver 110 may use one or more antennas to receive the symbols. FIG. 1 illustrates the position determining functionality using as an example signals received from two base stations 101, 103 with the receiver 110 using a single antenna, which is the minimum configuration for an RSTD measurement. This configuration can be extended to a greater number of base stations and a greater number of user equipment antennas.

Because user equipment receiver 110 is compliant with the LTE standard, the receiver can process received OFDM symbols to provide best estimates of the transmitted bits. Such a receiver 110 can identify the first path using one or more first path identification (FP-ID) modules 130, 140, which are responsive to subcarriers assigned to calculate positioning information. Each first path identification module 130, 140 is responsive to information 132, 142 provided by the user equipment receiver 110 about the subcarriers to be used for positioning measurements. For example, the information may be stored within tables in non-volatile memory.

The first path identification units 130, 140 identify the respective first path for the received OFDM symbols from a known eNodeB. The reference signal time difference (RSTD) measurement typically is based on a predetermined duration of OFDM symbols to achieve the desired accuracy.

In LTE, this may be over at least one sub-frame of OFDM symbols, which is specified to be fourteen OFDM symbols.

The output from each first path identification module 130, 140 is the time of arrival (TOA) at the user equipment of a signal from the corresponding base station. Generally, in LTE, the $RSTD_{k,j}$ between base stations indexed as k and j is determined as $$RSTD_{k,j}=TOA_k-TOA_j. \quad \text{EQ. 1}$$

FIG. 1 shows that module 150 of the receiver 110 provides as its output 152 the equation 1 reference signal time difference computation. This output $RSTD_{0,1}$ 152 is the output 134 of first path identification module 130 minus the output 144 of first path identification module 140.

The calculation of $RSTD_{k,j}$ is simple given a reliable estimation of the $TOA_k$ and $TOA_j$, knowing the structure of the signal received at the first path identification FP-ID module 130, 140. The standard, such as the LTE standard, specifies the structure of the symbol, which can be generalized as shown in FIG. 2. Modern wireless systems that transmit from one source, such as a base station, to multiple users in the coverage area, require the transmission to be subdivided into "subchannels." This is not much different in concept than FM or AM radio transmission; however, wireless transmission has a goal of very high bits/sec/Hertz for a given spectrum. In the case of modern wireless technology, specifying channels can be achieved using orthogonal schemes, which include OFDM and code division multiple access (CDMA). In the near future the wireless standards may increase capacity by using quasi-orthogonal channels achieved in myriad spatial and temporal strategies.

FIG. 2 simplifies the explanation of the signals involved in an observed time difference of arrival (OTDOA) measurement by showing a method that assumes orthogonal channelization. That is, while orthogonality is retained, the crosstalk between channels is kept to insignificant levels.

The FIG. 2 horizontal axis 201 represents time, qualitatively representing the time occupied by received symbols. FIG. 2's vertical axis shows a second channel dimension such that FIG. 2 qualitatively shows channels as having no overlap. The vertical axis channel separation can represent segments of frequency, as in the case of OFDM, or the indexing of different codes in CDMA. For example, in the LTE standard, the segmentation in the frequency axis can represent 15 kHz of bandwidth for a subcarrier, with an OFDM symbol possibly consisting of up to 600 active subcarriers out of 1024 total subcarriers in one symbol. This is only an example and other allocations are known. Thus, for example, the extent of each square in FIG. 2 can represent 15 kHz (y-axis) by 71.4 μs (x-axis) in the frequency-by-time grid. The value 71.4 μs is determined by the 1000 μs duration of an LTE subframe divided by the number 14 of OFDM symbols specified as making up an LTE subframe. In LTE terminology, each 15 kHz (y-axis) by 71.4 μs (x-axis) block in the grid is called a resource element (RE). A seven-symbol (500 μs) by 12-subcarrier (180 kHz) time-frequency allocation is called a resource block (RB) in 3GPP LTE.

The following discussion of FIG. 2 focuses on OFDM transmission, but it should be appreciated that FIG. 2 can equally illustrate other transmission systems. For example, FIG. 2 can illustrate other orthogonal schemes such as CDMA transmission as well as transmission strategies such as those being used for next generation wireless (5G). The orthogonal or quasi-orthogonal transmission strategies might be used for subchannels or for signaling related to observed time difference of arrival (OTDOA) measurements, among other transmission strategies.

To allow for user equipment terminals to determine position by computing OTDOA, certain wireless standards assign subcarriers in the grid to be used for determining position or accomplishing OTDOA functionality. To simplify this discussion, exemplary OTDOA subcarriers are designated as "location pilots" (LP) 212, 214, 216 in FIG. 2. The term pilot is used to denote a subcarrier with a known transmit modulation at the receiver. These pilot subcarriers are in contrast to data subcarriers, which have unknown modulation characteristics because they are encoded with unknown information bits. This pilot scheme allows a compatible terminal to accomplish various measurements. User equipment terminals generally need to estimate the channel impulse response (CIR) and other parameters for successful reception and demodulation of OFDM symbols. Consequently, the grid shown in FIG. 2 likely contains other subcarriers designated as pilots. These persistent pilots are denoted as estimation pilots (EP) and are indicated as 221, 223, 225 in FIG. 2. In LTE, these locations, and EP modulating bits, are known at the receiver because they are dictated by the LTE specification. In UE-assisted systems, user equipment terminals perform TDOA measurements using these pilots and send the measurements to a location server configured to perform a hyperbolic TDOA position calculation.

Referring now to FIG. 3, a simplified representation is provided of a conventional UE-assisted positioning system 300. As shown, the system 300 includes network infrastructure 310 including a base station almanac (BSA) 320, a position assistance data calculator 324 and a position estimator 328 located in, for example, a location server. The location server in a conventional UE-assisted positioning system is comprised of the position assistance data calculator 324 and the position estimator 328. The mobile network operator (MNO) maintains the BSA 320 and provides it as input to the location server. For control plane solutions the location server is referred to as the E-SMLC and for user plane solutions the location server is known as the SLP. The position estimator 328 is configured to provide position estimates in a known manner based upon measurements 330 received from a UE 350. A power and timing measurements module 354 generates the measurements 330 based upon assistance data 358 received from the position assistance data calculator 324. During operation, a location server may provide information from the BSA 320 to nearby cells to facilitate positioning calculations. Unfortunately, the assistance data 358 generated from information in the BSA 320 must be downloaded to the UE 350 and measurements 330 uploaded to the position estimator 328 for each position update. This creates network congestion and compromises the battery life of the UE 350.

In the current state of the art the assistance data 358 is comprised of 10s of cells used for positioning. For example, in 3GPP TS 36.355, "LTE Positioning Protocol (LPP)", the number of OTDOA neighbor cells for a given frequency layer is 24. The location server derives the "best set" of 24 cells using the ECGI of the serving cells, a globally unique identifier of a cell. However, the location server only has a very rough estimate of the location of the UE 350 when deriving the 24 cells. This rough estimate may be, for example, the centroid or transmission point of the serving cell, i.e., the basic cell ID position. As shown in FIG. 4, the initial position estimate used to derive the assistance data 358 is defined as the seed estimate 410. However, a seed estimate 410 based on basic cell ID positioning can result in a poor set of cells selected for the assistance data 358.

UE-based ("UE-B") cellular positioning is similar to UE-assisted where a location server supplies assistance data (AD) to a UE. In UE-B systems the assistance data includes the additional information required for the UE to estimate the location locally. UE-B has technical advantages over UE-A. In UE-B, the UE is not required to transmit measurements to the location server. Uplink transmissions are costly in terms of battery drain, which renders UE-A approaches disadvantageous relative to UE-B approaches in terms of battery life. UE-B also relieves network congestion since measurements are not transmitted in the uplink. For 5G massive IoT (internet of things) scenarios with many thousands or even millions connected devices per cell excess uplink transmissions for UE-A positioning purposes may exhaust spectral and time resources. UE-B, on the other hand, reduces the uplink traffic, easing the rollout of services at scale.

Both UE-A and UE-B cellular positioning offer technical advantages over traditional GNSS positioning in terms of indoor coverage and lower power consumption. These cellular positioning methods also offer a benefit over Wi-Fi and Bluetooth location that relies on proprietary lookup tables and cost-prohibitive beacon deployments.

SUMMARY

Disclosed herein is a mobile-based positioning system and method which uses assistance data provided by a repository of base station almanac (BSA) information downloaded from a server and stored onboard the mobile device (or user equipment, UE) as a micro-BSA. The disclosed system and method improves upon the state-of-the-art in downlink cellular positioning by offering, for example, improvements in network efficiency, positioning accuracy, cost and device battery life. These improvements are achieved at least in part by leveraging the location awareness of the UE arising from the disclosed UE-based positioning method.

As is discussed herein, the micro-BSA stored on the UE is used for improved assistance data generation, which may be refined based upon measurements and position estimates made on the device. This higher quality assistance data leads to more accurate position estimates being generated by the UE relative to the estimates generated using state-of-the-art TDOA techniques. Moreover, the onboard generation of assistance data enables the UE to roam and generate updated position estimates of high accuracy without the need for interaction with the network. This therefore relieves network congestion and improves the battery life of the device.

In one aspect the disclosure relates to a method performed in a mobile device for estimating position of the mobile device. The method includes receiving, from a network server, observed time difference of arrival (OTDOA) assistance data for a first plurality of cells from a base station almanac (BSA) accessible to the network server. The OTDOA assistance data is stored within a memory of the mobile device as a first micro-BSA. An initial position estimate for the mobile device is determined based upon time difference of arrival (TDOA) measurements associated with an initial subset of the first plurality of cells and initial OTDOA assistance data corresponding to the initial subset of the first plurality of cells. The initial OTDOA assistance data is generated by the micro-BSA based upon an initial seed estimate. An improved position estimate for the mobile device is determined based upon TDOA measurements associated with an additional subset of the first plurality of cells and improved OTDOA assistance data corresponding to the additional subset of the first plurality of cells. The improved OTDOA assistance data is generated by the micro-BSA based upon the initial position estimate.

The method may further include storing, within the memory of the mobile device, additional OTDOA assistance data for a second plurality of cells from the BSA as a second micro-BSA. The second plurality of cells includes at least one cell not included within the first plurality of cells.

In accordance with another aspect of the disclosure the determining the improved position estimate may further include calculating a first position estimate for the mobile device based upon TDOA measurements associated with a first configuration of cells within the first plurality of cells and first improved OTDOA assistance data corresponding to the first configuration of cells wherein the first configuration of cells is characterized by a first geometric dilution of precision (GDOP). A second position estimate for the mobile device is determined based upon TDOA measurements associated with a second configuration of cells within the first plurality of cells and second improved OTDOA assistance data corresponding to the second configuration of cells wherein the second configuration of cells is characterized by a second GDOP. A third position estimate for the mobile device may also be calculated using an alternate positioning method not involving TDOA measurements. The determining the improved position estimate may then further include selecting among the first position estimate, the second position estimate and the third position estimate.

In a further aspect of the disclosure the mobile device transitions, after determining the initial position estimate, into a low power sleep mode. In this case the method for estimating position of the mobile device further includes determining, upon the mobile device temporarily transitioning out of the low power sleep mode, an updated position estimate for the mobile device based upon additional time difference of arrival (TDOA) measurements associated with the initial subset of the first plurality of cells and additional OTDOA assistance data corresponding to the initial subset of the first plurality of cells wherein the additional OTDOA assistance data is generated by the micro-BSA based upon the initial position estimate. The mobile device is configured to transition, after determining the updated position estimate, into the low power sleep mode.

The disclosure is also directed to a mobile device including a processor, a receiver in communication with the processor, and a memory including program code executable by the processor for estimating position of the mobile device. The program code includes code for receiving, from a network server, observed time difference of arrival (OTDOA) assistance data for a first plurality of cells, the OTDOA assistance data included within a base station almanac (BSA) accessible to the network server. The program code further includes code for storing, within the memory, the OTDOA assistance data as a first micro-BSA. The program code also includes code for determining an initial position estimate for the mobile device based upon time difference of arrival (TDOA) measurements associated with an initial subset of the first plurality of cells and initial OTDOA assistance data corresponding to the initial subset of the first plurality of cells. The initial OTDOA assistance data is generated by the micro-BSA based upon an initial seed estimate. The program code further includes code for determining an improved position estimate for the mobile device based upon TDOA measurements associated with an additional subset of the first plurality of cells and improved OTDOA assistance data corresponding to the additional subset of the first plurality of cells. The improved OTDOA assistance data is generated by the micro-BSA based upon the initial position estimate.

The disclosure also pertains to a method performed in a mobile device for estimating position of the mobile device. The method includes receiving, from a network server, first observed time difference of arrival (OTDOA) assistance data for a first plurality of cells and second OTDOA assistance data for a second plurality of cells from a base station almanac (BSA) accessible to the network server, the first plurality of cells corresponding to a first geographic area and the second plurality of cells corresponding to a second geographic area different from the first geographic area. The second plurality of cells include at least one cell not included within the first plurality of cells. The method further includes storing, within a memory of the mobile device, the first OTDOA assistance data as a first micro-BSA and the second OTDOA assistance data as a second micro-BSA. A first position estimate for the mobile device is then determined, without receiving additional OTDOA assistance data from the network server, based upon first time difference of arrival (TDOA) measurements associated with a subset of the first plurality of cells and first OTDOA assistance data corresponding to the subset of the first plurality of cells. The first OTDOA assistance is generated by the first micro-BSA based upon a prior position estimate. The method also includes determining, without receiving additional OTDOA assistance data from the network server, a second position estimate for the mobile device based upon second time difference of arrival (TDOA) measurements associated with a subset of the second plurality of cells and second OTDOA assistance data corresponding to the subset of the second plurality of cells. The second OTDOA assistance is generated by the second micro-BSA based upon the first position estimate.

In yet another aspect the disclosure concerns a method performed in a mobile device for estimating position of the mobile device. The method includes receiving, from a network server, observed time difference of arrival (OTDOA) assistance data for a first plurality of cells from a base station almanac (BSA) accessible to the network server. The OTDOA assistance data is stored, within a memory of the mobile device, as a first micro-BSA. The method further includes determining a first position estimate for the mobile device based upon time difference of arrival (TDOA) measurements associated with a subset of the first plurality of cells and initial OTDOA assistance data corresponding to the subset of the first plurality of cells. An artificial intelligence (AI) management module predicts an expected route to be traveled by the mobile device. Observed time difference of arrival (OTDOA) assistance data is received, from the network server, for a second plurality of cells from the BSA. The second plurality of cells are determined by the AI management module to be proximate an expected route to be traveled by the mobile device, the second plurality of cells including at least one cell not included within the first plurality of cells. A second position estimate is then determined based at least in part upon second OTDOA assistance data corresponding to a subset of the second plurality of cells.

The disclosure is also directed to a method performed in a mobile device for estimating position of the mobile device. The method includes determining a first position estimate for the mobile device based upon time difference of arrival (TDOA) measurements associated with at least a subset of a first plurality of cells and observed time difference of arrival OTDOA assistance data corresponding to the subset of the first plurality of cells. The TDOA measurements are associated with a first TDOA measurement vector and the OTDOA assistance data is stored within a micro-BSA within a memory of the mobile device. The method further includes determining a quality of the first position estimate by at least calculating a first TDOA residual error vector using the first position estimate and detecting, based upon the first TDOA residual error vector, a bad cell included within the subset of the first plurality of cells. A second TDOA measurement vector is then constructed by removing the TDOA measurements associated with the bad cell from the first TDOA measurement vector and a quality of the second position estimate for the mobile device is determined based upon the second TDOA measurement vector.

In an additional aspect the disclosure relates to a method performed in a mobile device for estimating position of the mobile device. The method includes determining time of arrival (TOA) estimates of signals received from a plurality of cells in a vicinity of the mobile device and determining values of a quality metric associated with the TOA estimates. One of the plurality of cells is selected, based upon the values of the quality metric associated with the TOA estimates, as a reference cell. The method further includes determining time difference of arrival (TDOA) measurements between the reference cell and neighbor cells included within the plurality of cells. An initial estimate of a position of the mobile device is determined using a plurality of the TDOA measurements and associated observed time difference of arrival (OTDOA) stored within a micro-BSA within a memory of the mobile device. The plurality of TDOA measurements are associated with a subset of the TOA estimates having values of the quality metric relative to value of the quality metric corresponding to TOA estimates associated with other of the TDOA measurements. The method further includes determining sequential additional position estimates by updating the initial estimate of the position of the mobile device using additional ones of the TDOA measurements and associated OTDOA assistance data until a stopping criteria is satisfied. The determining sequential additional position estimates may include assessing a quality of the sequential additional position estimates by at least one of: (i) evaluating contours in a position estimation cost function, and (ii) calculating a time difference of arrival (TDOA) residual error vector.

The disclosure also concerns a method which involves sending, by a network server to a mobile device, observed time difference of arrival (OTDOA) assistance data for a first plurality of cells from a base station almanac (BSA) accessible to the network server. The OTDOA assistance data is stored, within a memory of the mobile device, as a first micro-BSA. The mobile device is configured to determine a first position estimate for the mobile device based upon time difference of arrival (TDOA) measurements associated with a subset of the first plurality of cells and initial OTDOA assistance data corresponding to the subset of the first plurality of cells. An expected route to be traveled by the mobile device is predicted by an artificial intelligence (AI) management module. The network server then sends, to the mobile device, observed time difference of arrival (OTDOA) assistance data for a second plurality of cells from the BSA. The second plurality of cells are determined by the AI management module to be proximate an expected route to be traveled by the mobile device and include at least one cell not included within the first plurality of cells. The mobile device is configured to determine a second position estimate based at least in part upon second OTDOA assistance data corresponding to a subset of the second plurality of cells.

The disclosure is additionally directed to a method which involves determining time of arrival (TOA) estimates of signals received from a plurality of cells in a vicinity of a mobile device. The method includes determining time difference of arrival (TDOA) measurements between a reference cell and neighbor cells included within the plurality of cells and determining an estimated position of the mobile device using a plurality of the TDOA measurements and associated observed time difference of arrival (OTDOA). The method further includes determining an uncertainty in the estimated position by evaluating contours of a cost function formed from the plurality of the TDOA measurements where the uncertainty corresponds to an area associated with one of the contours.

BRIEF DESCRIPTION OF THE FIGURES

The invention is more fully appreciated in connection with the following detailed description taken in conjunction with the accompanying drawings, in which.

DETAILED DESCRIPTION

Figure 1:
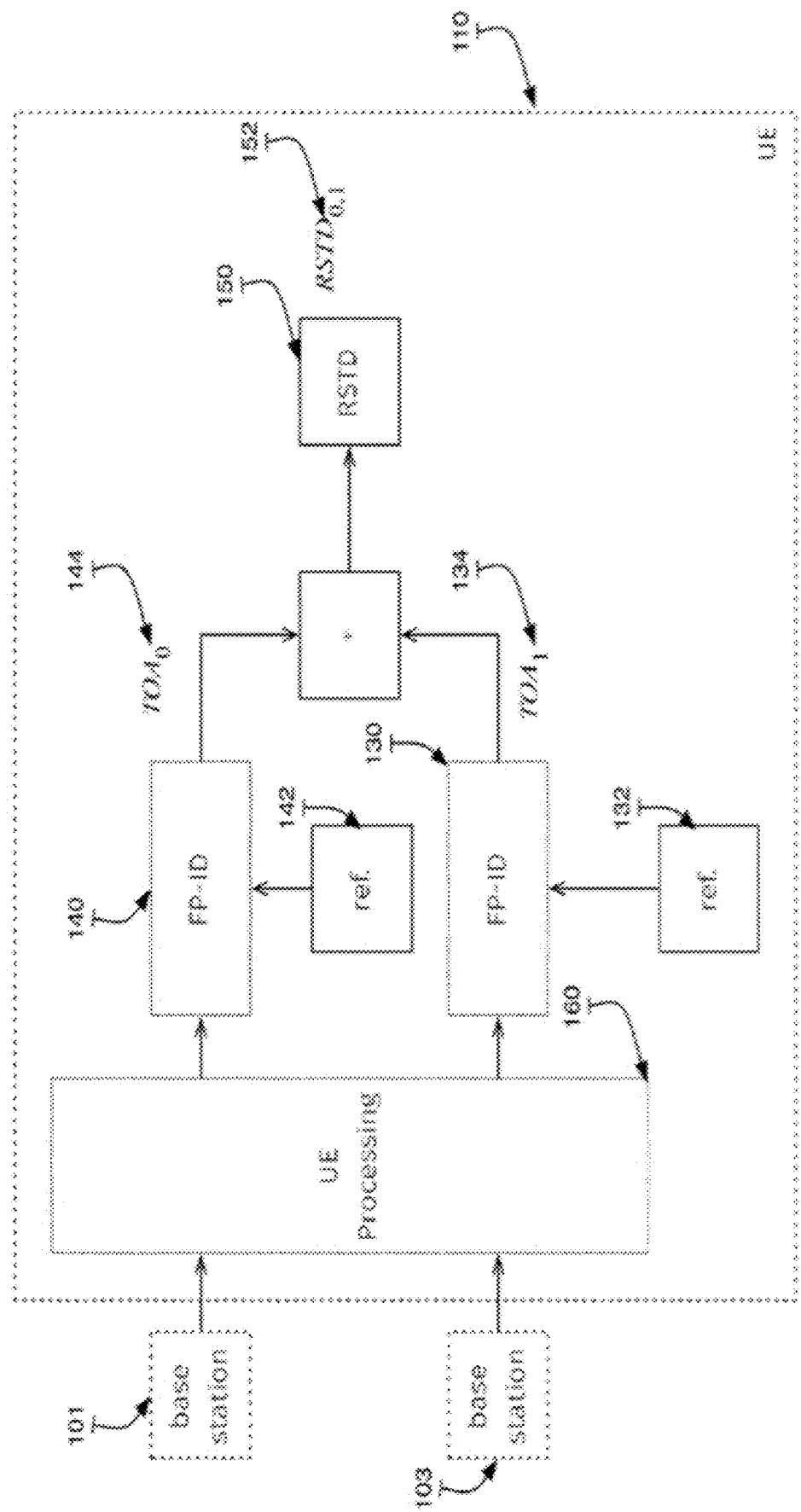
FIG. 1 provides a functional block diagram of apparatus for determining position using observed time difference of arrival (OTDOA) based on the reference signal time difference (RSTD) measurement specified in the LTE standard.
Figure 2:
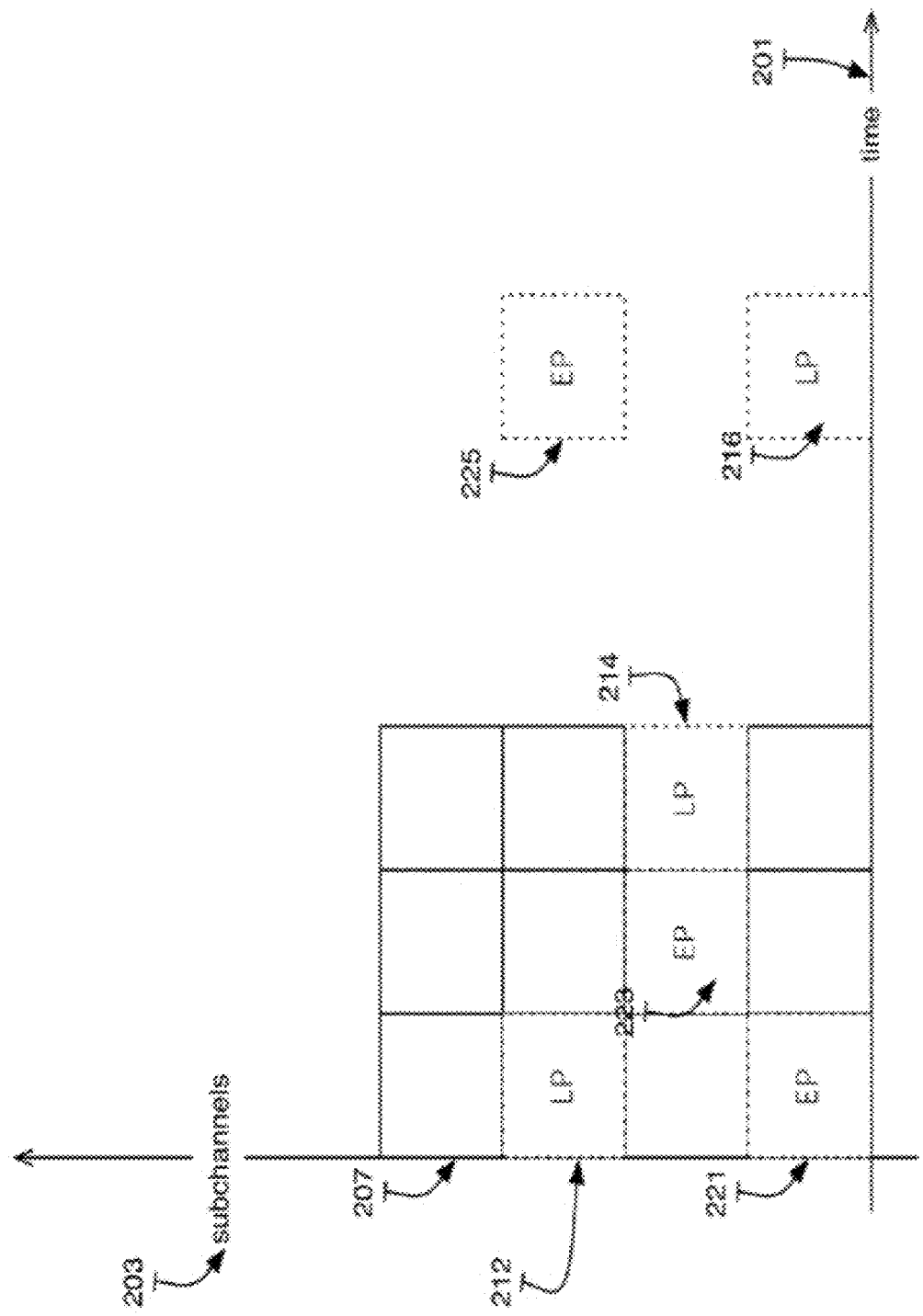
FIG. 2 illustrates a generalized view of a symbol structure of the type used in the LTE standard.
Figure 3:
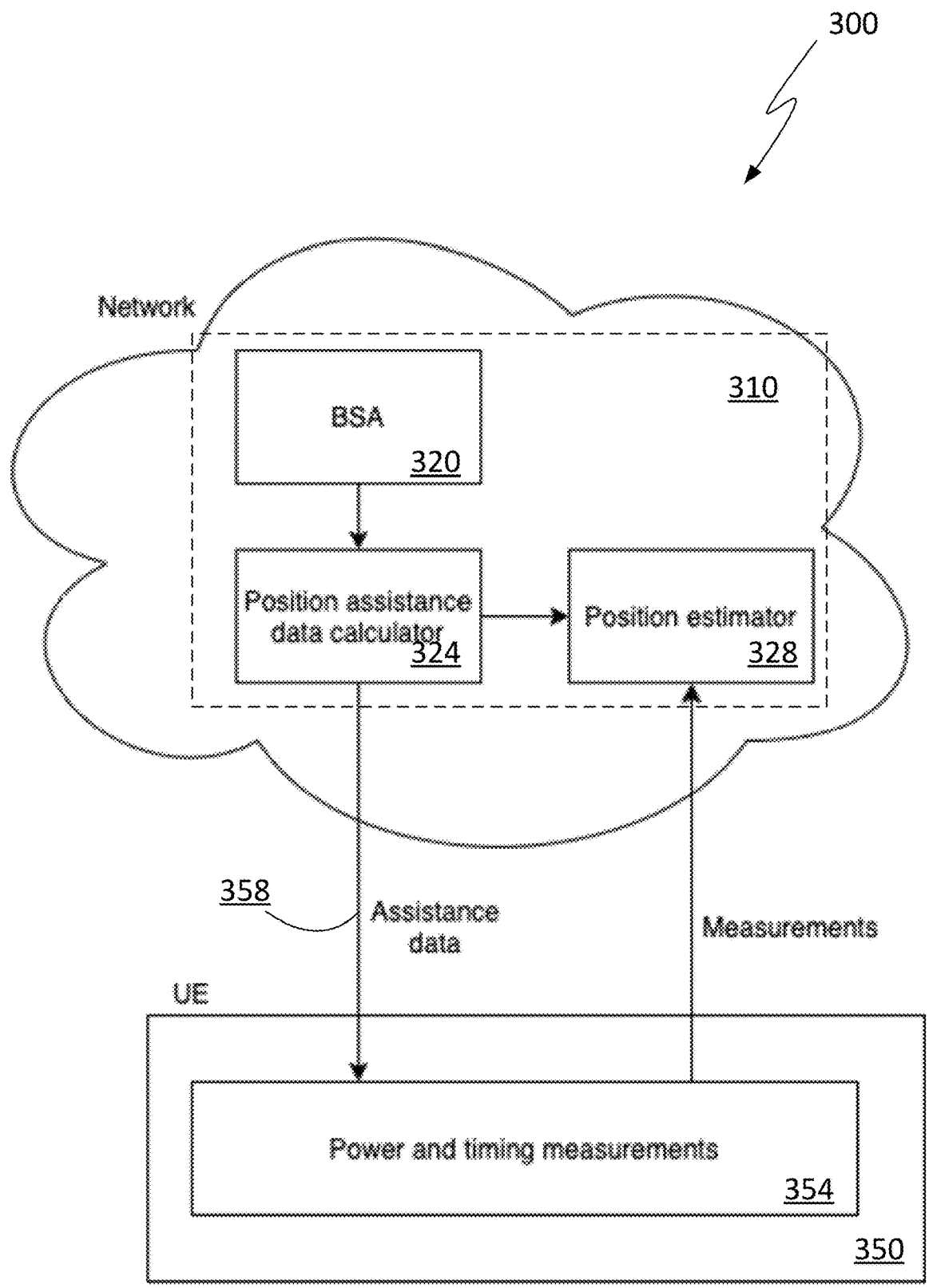
FIG. 3 provides a simplified representation of a conventional UE-assisted positioning system.
Figure 4:
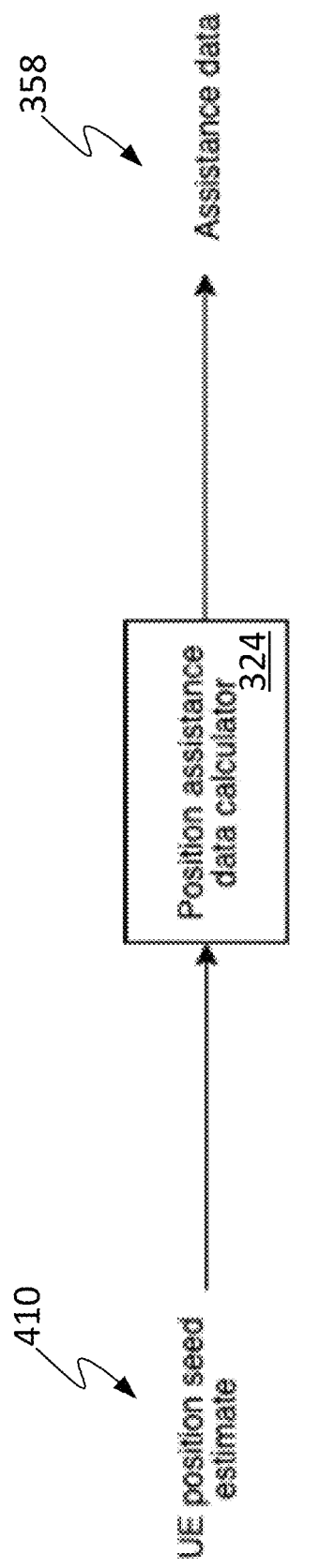
FIG. 4 illustrates using an initial position estimate in the form of a seed estimate to derive positioning assistance data.
Figure 5:
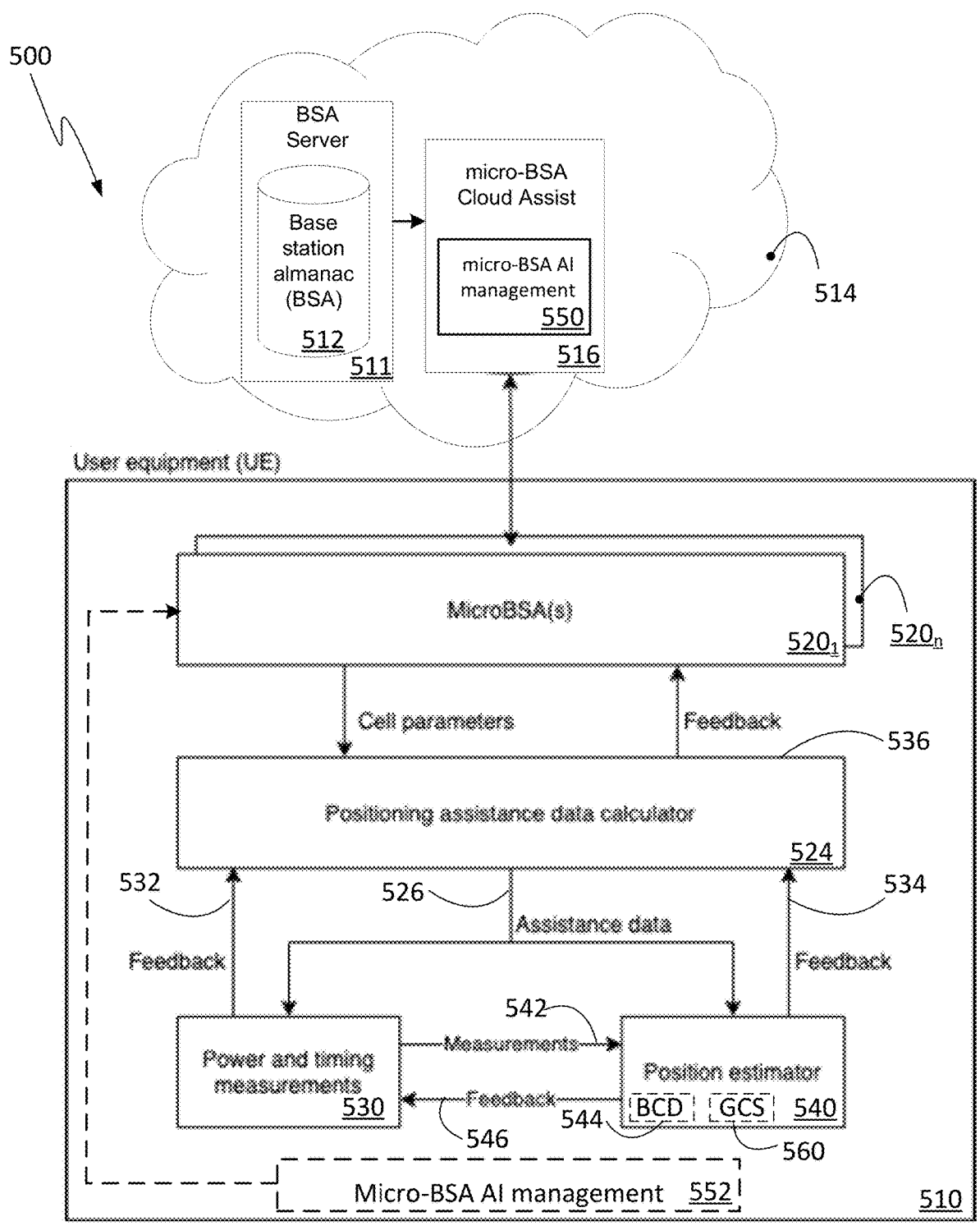
FIG. 5 illustrates a functional view of a positioning system in accordance with an embodiment.

Attention is directed to FIG. 5, which illustrates a functional view of a positioning system 500 in accordance with an embodiment. As is discussed below, the system 500 includes a UE 510 configured to generate positioning assistance data 526 based upon a relatively small subset of a base station almanac (BSA) 512 accessible to a BSA server 511 within a network 514. The BSA 512 may reside on a server in communication with the BSA server 511 or may be included on the BSA server 511. In one embodiment information from the BSA 512 is provided to the UE 510 by a micro-BSA cloud assist server 516 within the network 514.

The functional elements of the UE 510 include one or more micro-BSA(s) 520 configured to store information corresponding to the subset of the BSA 512 received by the UE 510 from the micro-BSA cloud assist server 516. The micro-BSA(s) 520 may be computed with information of the UE 510 serving cell ECGI to provide a rough estimate of the UE location. A positioning assistance data calculator 524 is configured to receive cell parameters from the micro-BSA(s) 520 for use in generating the assistance data 526. The positioning assistance data calculator 524 may use the ECGI of the serving cell to derive a rough estimate of the UE location from which to calculate the assistance data 526. As shown, the assistance data 526 is provided to a power and timing measurements module 530 and a position estimator 540. As is discussed below, the calculator 524 is further configured to be responsive to measurement feedback 532 and position estimate feedback 534 in providing cell selection feedback 536 useful in intelligently updating the contents of the micro-BSA(s) 520. The position estimator 540 is configured to provide position estimates and the position estimate feedback 534 based upon the assistance data 526 and upon measurements 542 received from the power and timing measurements module 530. The power and timing measurements module 530 generates the measurements 542 and the measurement feedback 532 based upon the assistance data 526 and feedback 546 received from the position estimator 540.

In one embodiment the position estimator 540 performs OTDOA calculations based upon the assistance data 526 and measurements by the UE 510 of the time of arrival (TOA) of positioning reference signals (PRS) received from the base stations (e.g., eNodeBs) of multiple cells associated with the assistance data 526. The position estimator 540 subtracts the TOA of a reference cell (which may be selected by the UE 510 using known techniques) from the measured TOAs corresponding to such multiple cells in order to form reference signal time difference (RSTD) or time difference of arrival (TDOA) measurements. These TDOA measurements may be used together with the assistance data 526 to constrain the position of the UE 510 to a set of hyperbolas. If the TOA measurements made by the UE 510 were completely lacking in noise and interference, these hyperbolas would intersect at a single point corresponding to the position of UE 510. In practice, however, such noise and interference limits the accuracy at which the position of the UE 510 may be estimated. As is discussed herein, the use of micro-BSA(s) 520 in accordance with the disclosure improves the accuracy and efficiency with which the position of estimates of the position of the UE 510.

In terms of scale, in an exemplary embodiment the BSA 512 may contain information corresponding to hundreds of thousands of cells, the micro-BSA(s) 520 may contain information for hundreds of cells, and the assistance data 526 may pertain to tens of cells.

This BSA 512 is typically managed by a mobile network operator (MNO) and includes a database containing the cell parameters defining the network layout. Each cell in the database of the BSA 512 is typically characterized by a unique cell identifier (ECGI), a latitude and longitude of the cell transmission point, a physical cell index (PCI), antenna aperture and orientation details, transmission power, and various other parameters. The cloud assist server 516 interacts with the BSA 512 to provide the UE 510 with a small subset of the contents of the BSA 512. As noted above, the resulting micro-BSA 520 may consist of several hundred cells close to the serving cell of the UE 510. The storage and download requirements associated with even a 1000 cell micro-BSA 520 are modest. For example, assuming roughly 120 bits are required to represent the cell parameters for a given cell, only approximately 15 kB is required for a 1000-cell micro-BSA 520 (i.e., 1000 cells×120 bits/cell×1 kB/8000 bits=15 kB).

The information comprising this 15 kB, 1000-cell micro-BSA may be transferred to the UE 510 in a few seconds over the wireless link while the UE is in LTE connected mode. A smaller micro-BSA can be requested for shorter download times and less storage, and a larger micro-BSA can be requested for greater coverage and less overall interaction with the cloud assist server 516 or otherwise with the network 514. As a point of reference, for a typical cell density of 1 cell/km2, a 1000-cell micro-BSA 520 provides coverage for a 1000 km2 area. With a single micro-BSA 520 many position fixes can be obtained. Therefore, once the information for the micro-BSA 520 is downloaded, the UE 510 requires minimal additional interaction with elements of the network 514.

Accordingly, during operation of the UE 510 the position estimator 540 will be able to generate many position estimates even when the UE 510 is in motion based solely upon the measurements 542 and the assistance data 526 derived from information within the micro-BSA(s) 520. This advantageously improves battery life of the UE 510 and reduces network congestion. This is because almanac information is not provided by the BSA 512 nor is assistance data otherwise provided to the UE 510 by network in connection with each position estimate generated by the position estimator. Moreover, positioning accuracy is enhanced relative to the case in which such almanac information and/or assistance data is provided to the UE 510 to facilitate each position measurement since the UE 510 may, in some embodiments, employ filtering and other techniques to average or otherwise smooth the position estimates locally generated by the position estimator 540. The current state of the art UE-assisted method is considered a "single shot" estimate where assistance data is provided to the UE from the location server, the UE then reports measurements, and the location server estimates location with a single set of measurements. In this approach, the estimation algorithms cannot practically benefit from filtering since continuous measurement reporting is not feasible both from a UE battery drain and network congestion perspective. The measurements 542 are more efficiently supplied to the position estimator 540 for enhanced estimation processing.

Since the UE 510 is aware of its current location, the UE 510 may be configured to sense when new BSA information is required. For example, when the position estimator 540 is deriving high-quality position estimates, then no new BSA information is required from the micro-BSA cloud assist server 516. The position estimator 540 can determine if the estimates are of high quality by studying the contours of the likelihood or a posteriori function surface, or by calculating a TDOA residual error vector. The TDOA residual error vector is denoted by e and is given by:

$$e = r - h(\hat{x})$$

where r is a TDOA measurement vector for one of the additional position estimates and wherein each element of r includes a TDOA measurement associated with one of the set of cells included in the assistance data 526, and where $h(\hat{x})$ is a TDOA vector for a position estimate $\hat{x}$ and is given by:

$$h_m(\hat{x}) = \frac{1}{c}(\|\hat{x} - x_m\| - \|\hat{x} - x_1\|)$$

where $x_m$ is the location of the mth cell and $x_1$ is the location of a TDOA reference cell which is included in the assistance data 526 and selected by the UE 510. If the elements in e are relatively small, then the position estimator 540 has greater confidence that the position estimates are of high quality.

In one embodiment the position estimator 540 develops position estimates using a TDOA hyperbolic location signal model.

TDOA Hyperbolic Location Signal Model

In embodiments in which the UE 510 implements downlink time-difference of arrival (TDOA) hyperbolic location estimation, the UE 510 performs time of arrival (TOA) estimates on surrounding cells. In what follows the term "cells" is used interchangeably with "base stations" or "transmission points". In addition, the term "RSTD" (i.e., "reference signal time difference" as defined in the 3GPP standards) is used interchangeably with TDOA. The surrounding cells are assumed to be time-synchronized and transmitting positioning reference signals ("pilots") at some time near τ seconds. More specifically, the kth cell transmits at time $$\tau_k = \tau + \alpha_k,$$

where $\alpha_k$ is a relatively small transmit synchronization term. The TOA of the kth cell is $$t_k = \frac{1}{c}\|x - x_k\| + \tau_k + \beta_k,$$

where c is the speed of light in a vacuum, $X=[x,y]^T$ is the Cartesian coordinates of the unknown UE location, $x_k=[x_k, y_k]^T$ is the known Cartesian coordinates of the kth cell, and $$\beta_k = \begin{cases} 0, & \text{in a line-of-sight } (LOS) \text{ channel,} \\ > 0, & \text{otherwise,} \end{cases}$$

is a non-line-of-sight (NLOS) bias. Note that the above specifies two dimensions with x and y components, and the formulation extension to three dimensions is done by simply adding a third z component term.

Assume the UE 510 is synchronized to some serving cell that may or may not be the cell closest to the UE 510. Without loss of generality, this serving cell is indexed with k=0, and each of the other cells are indexed with k=1, 2, ..., K. To synchronize, the UE 510 estimates the TOA of the serving cell to be $$\tilde{t}_0 = t_0 + \gamma'_0,$$

where $\gamma'_0$ is a synchronization error term. The UE 510 then uses this time estimate to form a relative local time. Adjusting for the serving cell synchronization, the relative TOA of the kth cell becomes $$\tilde{t}_k = t_k - \tilde{t}_0$$
$$= \frac{1}{c}\|x - x_k\| + \tau + \alpha_k + \beta_k - \left(\frac{1}{c}\|x - x_0\| + \tau + \alpha_0 + \beta_0 + \gamma'_0\right)$$
$$= \frac{1}{c}(\|x - x_k\| - \|x - x_0\|) + (\alpha_k - \alpha_0) + (\beta_k - \beta_0) - \gamma'_0.$$

The term $$\frac{1}{c}(\|x - x_k\| - \|x - x_0\|)$$

is the TDOA between the kth cell and the serving cell. Thus, $\tilde{t}_k$ is a TDOA measure corrupted by cell transmit synchronization error ($\alpha_k - \alpha_0$), NLOS bias ($\beta_k - \beta_0$), and serving cell synchronization error $\gamma'_0$. Notice that the process of synchronizing with the serving cell removes the transmission time $\tau$ from the relative TOAs.

Next, the UE 510 performs estimates of the relative TOAs:

$$\hat{t}_k = \tilde{t}_k + \gamma_k$$
$$= \frac{1}{c}(\|x - x_k\| - \|x - x_0\|) + (\alpha_k - \alpha_0) +$$
$$(\beta_k - \beta_0) + (\gamma_k - \gamma'_0),$$

k=0, 1, ..., K, where $\gamma_k$ is due to estimation error.

The unknown location of the UE x may now be estimated from the relative TOA estimates $\{\hat{t}_k\}_{k=0}^{K}$ and the known cell locations $\{x_k\}_{k=0}^{K}$. However, a more robust approach may be to first form the TDOA estimates:

$$r_m = \hat{t}_{i(m)} - \hat{t}_{j(m)},$$

m=1, 2, ..., M. The subtraction of the relative TOA estimates removes the synchronization error term $\gamma'_0$:

$$r_m = \hat{t}_{i(m)} - \hat{t}_{j(m)}$$
$$= \frac{1}{c}(\|x - x_{i(m)}\| - \|x - x_{j(m)}\|) +$$
$$(\alpha_{i(m)} - \alpha_{j(m)}) + (\beta_{i(m)} - \beta_{j(m)}) + (\gamma_{i(m)} - \gamma_{j(m)}).$$

Removal of the synchronization error term may be beneficial in the event that the UE 510 is not well synchronized to the network. This is the method employed by the 3GPP specification.

It is convenient to represent the TDOA measurements in vector form:

$$\underbrace{r}_{\text{measurement vector}} = \underbrace{h(x)}_{\text{TDOA ground-truth vector}} + \underbrace{n}_{\text{TDOA noise vector}},$$

where the mth element of r is $r_m$, the mth element of h(x) is $$h_m(x) = \frac{1}{c}(\|x - x_{i(m)}\| - \|x - x_{j(m)}\|),$$

and the mth element of the noise vector n is $$n_m = \eta_{i(m)} - \eta_{j(m)},$$

with $$\eta_k = \alpha_k + \beta_k + \gamma_k$$

being the individual TOA noise component.

The i(m)th cell is considered the RSTD neighbor cell of the mth measurement, and the j(m)th cell is considered the RSTD reference cell of the mth measurement. In the 3GPP specification, a common RSTD reference cell is used: j(m)=$k_{ref}$ for some $k_{ref} \in \{0, 1, ..., K\}$. The remaining cells are candidate RSTD neighbor cells. Other strategies for pairing candidate RSTD neighbor cells to reference cells are possible. For example, one such potential pairing strategy may be characterized as all "N choose 2" cell-pairs, with N=K+1. See, e.g., F. Gustafsson and F. Gunnarsson, "Positioning using time-difference of arrival measurements," 2003 IEEE International Conference on Acoustics, Speech, and Signal Processing, 2003. Proceedings. (ICASSP '03), Hong Kong, China, 2003). Another possibility is a neighbor index approach such that i(m)=j(m)+1 and j(m)=m−1 for m=1, 2, ..., M=K. These listed strategies do not preclude the possibility of others, and the ones described have their benefits and costs. For example, the single reference cell is advantageous if a low-error reference cell is selected, but could underperform the nearest-neighbor approach if a high-error reference cell is selected. The exhaustive "N choose 2" may offer the location estimation algorithm with richer information at the cost of higher computational complexity.

Figure 13:
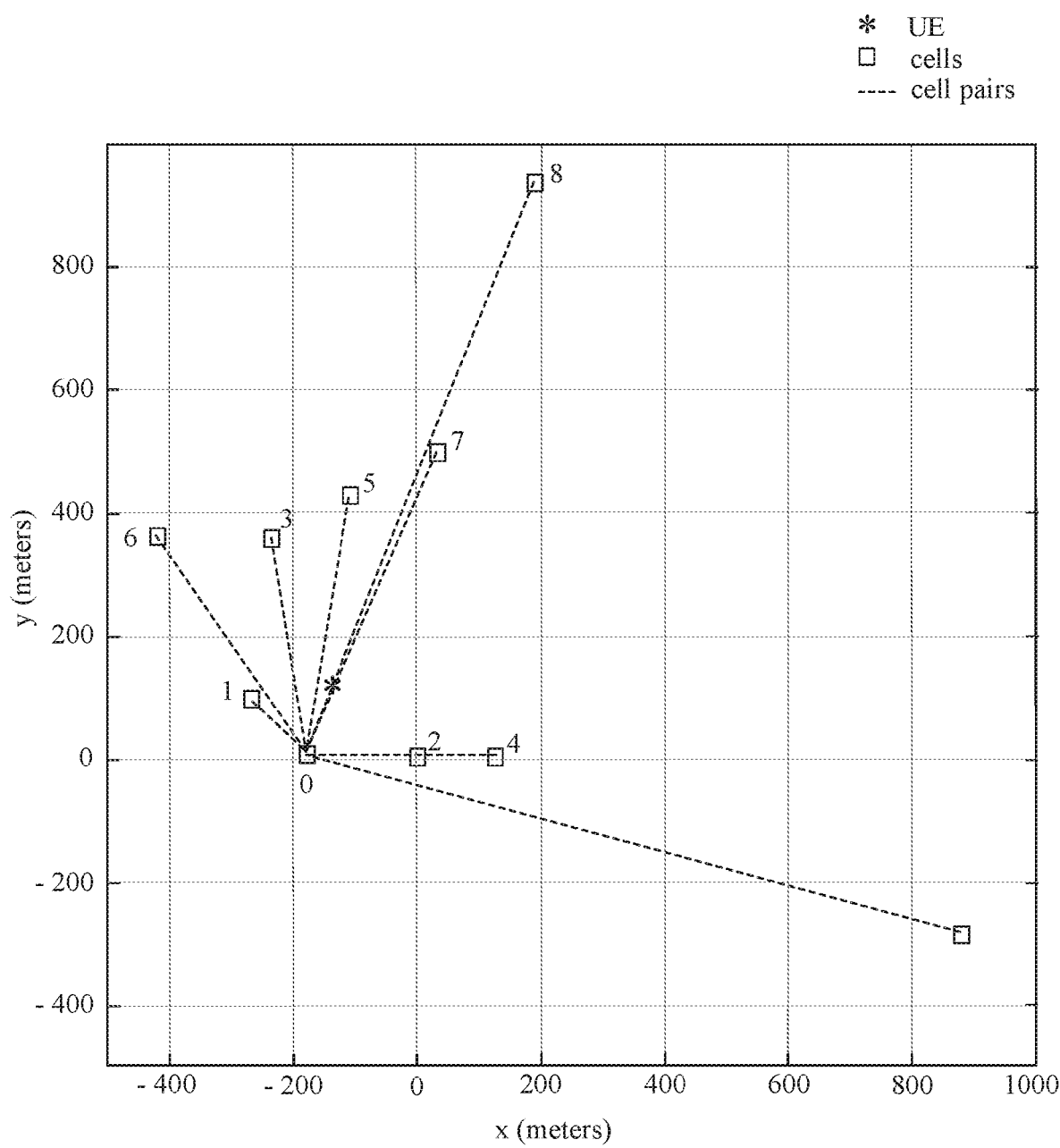
FIGS. 13-15 illustrate exemplary potential strategies for forming cell-pairs comprised of reference and neighbor cells.
Figure 14:
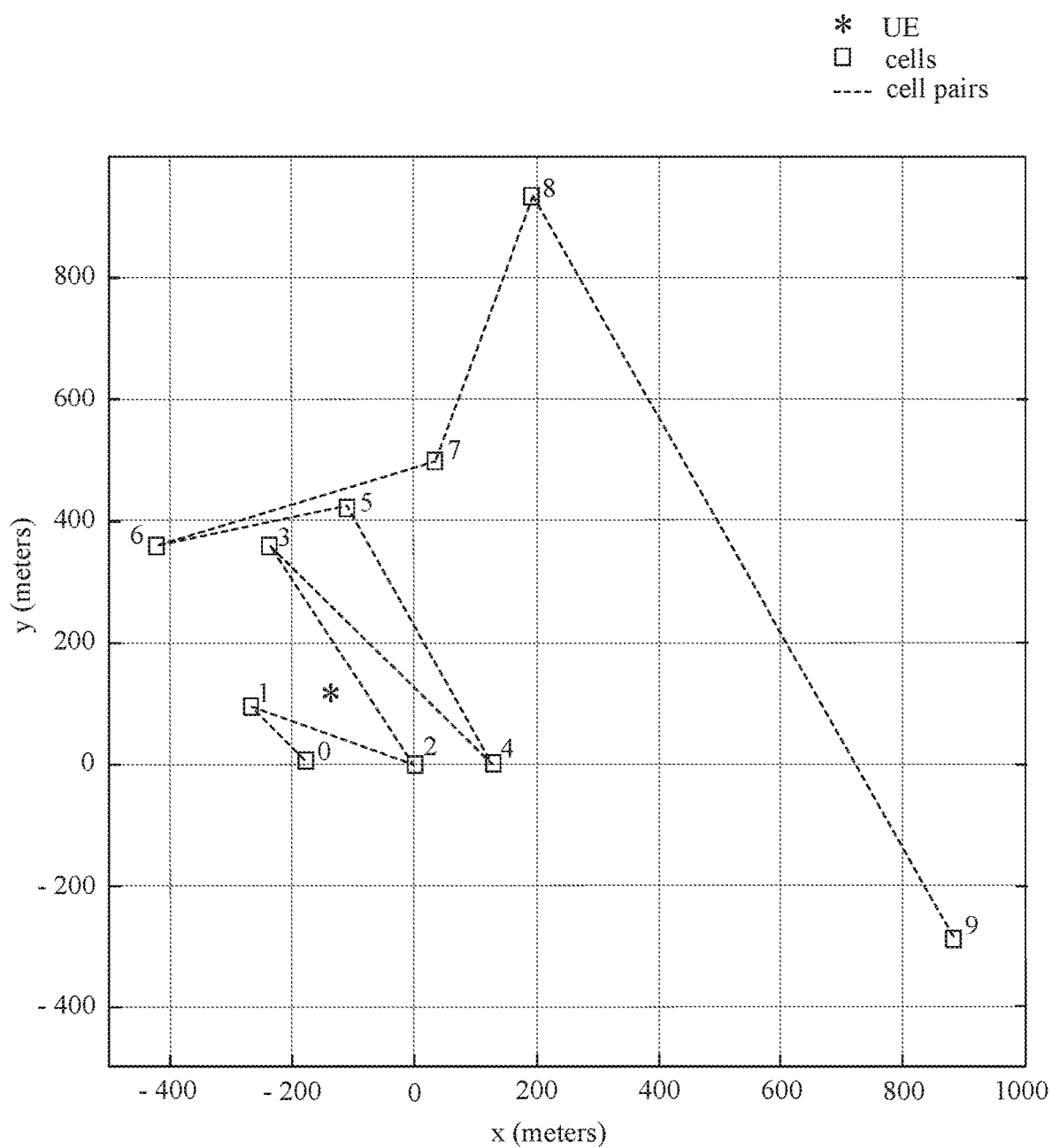
Figure 15:
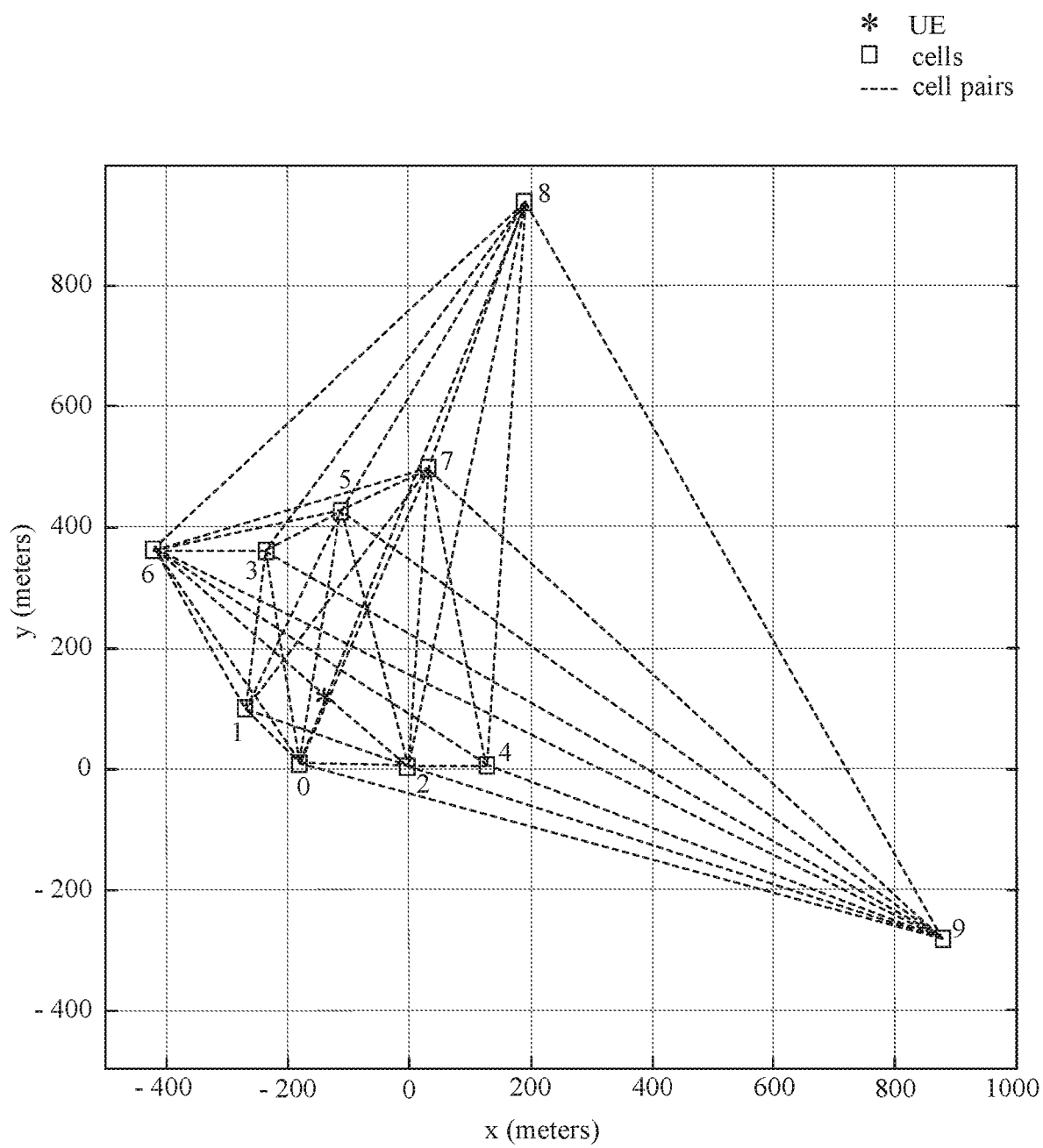

Attention is now directed to FIGS. 13-15, which illustrate exemplary potential strategies for forming cell-pairs comprised of reference and neighbor cells. Specifically, FIG. 13 depicts a single cell reference cell pairing strategy; FIG. 14 illustrates a neighbor index cell pairing strategy; and FIG. 15 illustrates an N-choose-2 cell pairing strategy.

TDOA Position Estimators

The TDOA position estimator 540 functions to determine a good estimate for x given the measurements in r. The position estimator 540 may utilize various different methods in making this determination including, for example, least squares, weighted least squares, and Gaussian maximum likelihood. The methods described below do not preclude the use of other possibilities.

Suppose the position estimator 540 has estimated the location of the UE 510 to be at $\hat{x}$. At this location the ground-truth TDOA between the i(m)th and j(m)th cell is $h_m(\hat{x})$ while the estimated TDOA is $r_m$. Their difference $$e_m = r_m - h_m(\hat{x})$$

is called the residual error. This term is useful since it is computationally realizable while the statistical error $n_m$ is unknowable at the receiver of the UE 510. The sum of the squared residual error components is:

$$J(\hat{x}) = \sum_{m=1}^{M} e_m^2 = \sum_{m=1}^{M} (r_m - h_m(\hat{x}))^2 = (r - h(\hat{x}))^T (r - h(\hat{x})).$$

To the extent the position estimator 540 is configured to find $\hat{x}$ to minimize $J(\hat{x})$, the position estimator 540 may be characterized as a least-squares (LS) estimator:

$$\hat{x}_{LS} = \operatorname*{argmin}_{x} J(x) = \operatorname*{argmin}_{x} (r - h(x))^T (r - h(x)).$$

Suppose some of the measurements in r to be of higher quality than others. It may be beneficial, therefore, for the position estimator 540 to put more weight on the higher quality estimates and less weight on the lower quality estimates. The weighted least squares (WLS) estimator does this:

$$\hat{x}_{WLS} = \operatorname*{argmin}_{x} \sum_{m=1}^{M} w_m e_m^2$$
$$= \operatorname*{argmin}_{x} \sum_{m=1}^{M} w_m (r_m - h_m(\hat{x}))^2$$
$$= \operatorname*{argmin}_{x} (r - h(x))^T D_{WLS} (r - h(x))$$

where $$D_{WLS} = \operatorname{diag}(w_1, w_2, \ldots, w_M)$$

is a diagonal weighting matrix. WLS is equivalent to LS when the weights are all the same.

Now suppose statistical information is available about the measurement vector r. Let p(r|x) be the probability of a measurement vector r when the location of the UE 510 is at x. This is known as the likelihood function and the estimate $$\hat{x}_{ML} = \operatorname*{argmax}_{x} p(r | x)$$

is known as the maximum likelihood (ML) estimate.

A special case of the ML estimator is the Gaussian maximum likelihood (GML) estimator where the likelihood function is expressed as:

$$p(r|x) = \frac{1}{(2\pi)^{M/2} |R|^{1/2}} \exp\left(-1/2 (r - h(x))^T R^{-1} (r - h(x))\right),$$

where $$R = E\left[(n - E(n))(n - E(n))^T\right]$$

is the M by M covariance matrix of the TDOA noise, E( ) is the expectation operator, |R| denotes the determinate of R, and the superscript−1 denotes matrix inverse. The GML estimator simplifies to $$\hat{x}_{GML} = \operatorname*{argmax}_{x} p(r | x)$$
$$= \operatorname*{argmax}_{x} \frac{1}{(2\pi)^{M/2} |R|^{1/2}} \exp\left(-1/2 (r - h(x))^T R^{-1} (r - h(x))\right).$$
$$= \operatorname*{argmin}_{x} (r - h(x))^T R^{-1} (r - h(x))$$

This shows the GML estimator is a type of WLS: GML is WLS where the weighting matrix is the noise covariance inverse.

A generalized weighted least squares estimator is expressed as $$\hat{x} = \operatorname*{argmax}_{x} (r - h(x))^T W (r - h(x)),$$

where W is a weighting matrix. For the three estimators identified above:

$$W = \begin{cases} I, & \text{for least squares} \\ D_{WLS}, & \text{for weighted least squares} \\ R^{-1}, & \text{for Gaussian maximum likelihood} \end{cases}$$

with I being the identify matrix.

The implementation of the position estimator 540 as the above GML estimator assumes the TOA to be drawn from a Gaussian distribution. A known generalization of this framework is to assume the TOA is drawn from a Gaussian Mixture Model (GMM). See, e.g., F. Perez-Cruz, C. Lin and H. Huang, "BLADE: A Universal, Blind Learning Algorithm for ToA Localization in NLOS Channels," 2016 IEEE Globecom Workshops (GC Wkshps), Washington, D.C., USA, 2016. The GMM framework better accounts for the multipath nature of the cellular radio frequency (RF) environment. Also, with prior statistical information about the location of the UE 510, the ML estimator implemented by the position estimator 540 can be generalized into the maximum a posteriori (MAP) estimator.

The weighted least squares estimator derived above minimizes the quadratic cost function $$Q(x) = (r - h(x))^T W (r - h(x)).$$

The minimization can be performed with numerical sampling of a rectangular or hexagonal grid, or by statistical sampling methods like Markov Chain Monte Carlo (MCMC) where the Metropolis Hastings algorithm is one example. Alternatively, it can be solved analytically through Taylor series expansion See, e.g., Torrieri, D. J. "Statistical Theory of Passive Location Systems," *IEEE Trans. on Aerospace and Electronic Systems* AES-20, 2 (March 1984). In the case of Gaussian Maximum Likelihood this cost function is the log of the likelihood function, known as the log-likelihood. Similarly, for maximum a posteriori (MAP) estimation, a similar formulation is derived by incorporating the so-called priori probability.

Adaptive Generation of Assistance Data from Micro-BSA Information

The BSA coherence time may be defined to be the time duration in which the BSA information remains relatively static and useful for positioning. The BSA coherence time is large relative to the position measurement update rate. For example, the BSA coherence time can be on the order of days or months while the position measurements might be updated once an hour. This allows for the same BSA information within the micro-BSA(s) 520 to be used across multiple position measurement events.

Consider the use case of geofencing. The owner of a valuable asset attaches to it a geofencing tracker device (which could be a simplified implementation of the UE 510). The owner wishes to be notified if the asset moves beyond a specified region. For days or months the asset may stay in the specified region. Over this duration of time the contents of the micro-BSA(s) 520 would be practically static as well, and the position estimator 540 generates high-quality position estimates. Under these conditions, an implementations of the UE 510 as a tracker device would require no additional BSA information and therefore would require no interaction with the BSA server 511 or other cloud server hosting the BSA 512.

Notably, in the current cellular positioning state of the art the UE is not location aware. Therefore this network relieving feature is not possible. The current state of the art is not efficient in that assistance data must be downloaded to the UE and measurements uploaded to a location server for each position update. This causes the problem of network congestion and compromises the battery life of the device. In contrast, the UE 510 is "location aware" so as to better, and more efficiently, enable applications like geofencing. This location awareness also allows for a faster positioning fix, reducing latency and improving time-to-first fix (TTFF). These features allow for battery-efficient breadcrumbing applications where the UE is mostly in a low power sleep mode. It momentarily wakes up, updates its position estimate, then returns to a lower power state. The faster the position updates the more efficient the solution.

As noted in the Background, in the current state of the art the assistance data is comprised of 10s of cells used for positioning and a conventional location server derives a "best set" of cells using a globally unique identifier of a cell. However, this provides the location server with only a very rough seed estimate of the UE location when deriving the set of cells to be used in generating assistance data.

Figure 6:
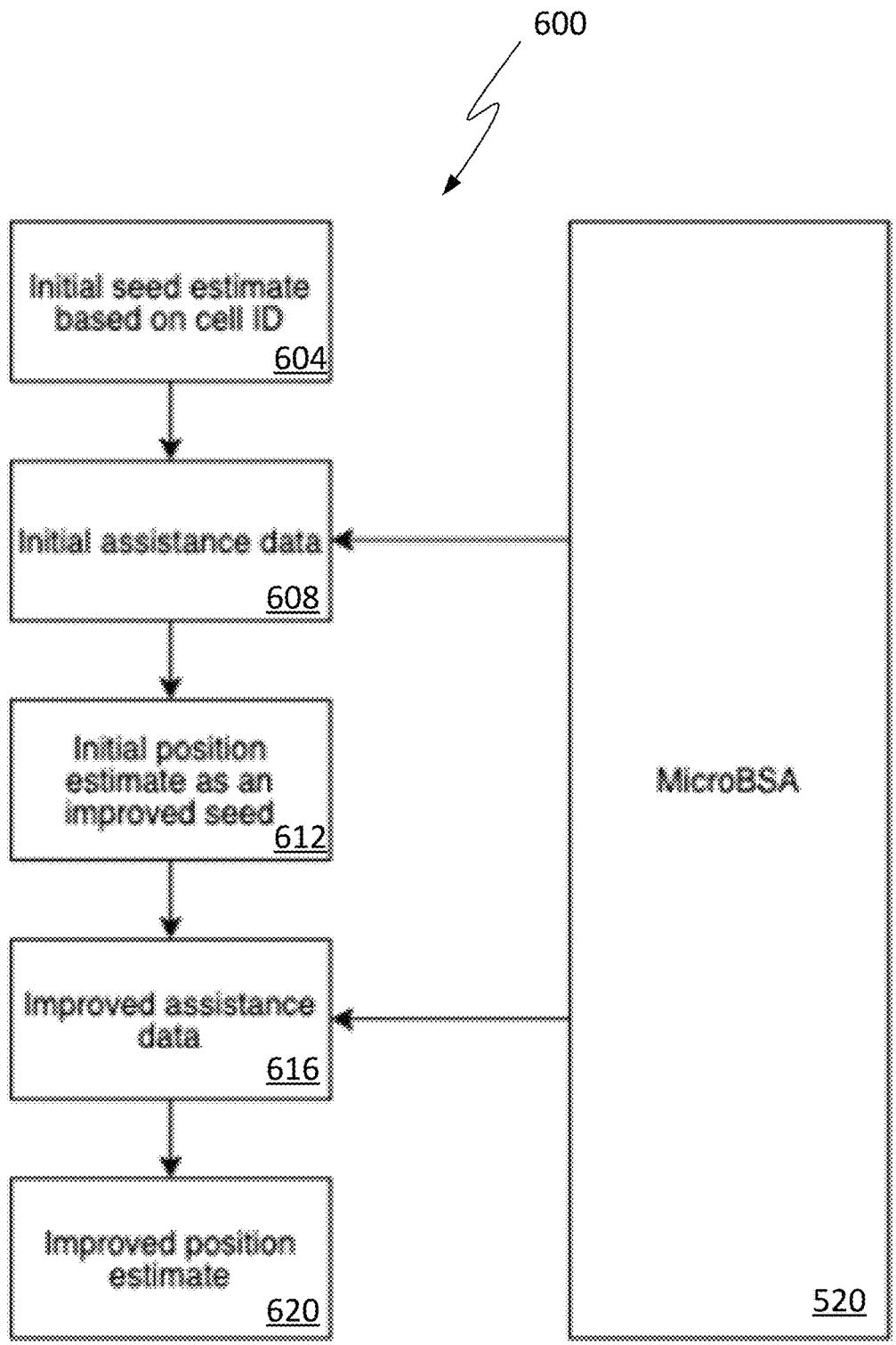
FIG. 6 is a flow chart of a sequence of operations performed by a UE in accordance with an embodiment.

Attention is now directed to FIG. 6, which is a flow chart of a sequence of operations 600 performed by the UE 510 which highlight one way in which intelligent and adaptive generation of assistance data 526 within the UE 510 may be utilized to address this shortcoming in the current state of the art. Again, in one embodiment the micro-BSA(s) 520 include information pertaining to more cells than the cells represented in the assistance data 526. This larger collection of cells in the micro-BSA(s) 520 provides improved flexibility in generating a good set of cells for the assistance data 526. Referring to FIG. 6, an initial set of assistance data cells is generated (stage 608) using a basic cell ID 604 for the seed estimate. Then, an initial position estimate is derived with a position estimate that is better than the basic cell ID estimate (stage 612). This new estimate is used to re-derive the assistance data and thereby generate improved assistance data (stage 616). This is done efficiently on the UE 510 using the local micro-BSA(s) 520 without having to interact with the micro-BSA cloud assist server 516 or otherwise having to interact with the network 514. An improved position estimate may then be generated using the improved assistance data (stage 620). This method 600 of improved seed estimates to generate better assistance data can of course iterate across time.

Device Initialization and Population of Micro-BSA(s)

The BSA 512 is controlled by the network operator and has the parameters for all the cells in the network (e.g., ~700,000 cells for the largest operators). A micro-BSA 520 typically includes a tiny subset of the information within the BSA 512 for cells in the vicinity of the UE 510. For example, a micro-BSA 520 could include parameters for 1,000 cells that make up a metropolitan area including an urban downtown and surrounding areas. For UE-based OTDOA the micro-BSA 520 has parameters needed to perform the OTDOA algorithms. The OTDOA algorithms consist of, for example: (i) generating assistance data (AD) from the micro-BSA 520, (ii) using assistance data (AD) to perform TOA/TDOA measurements, and using TOA/TDOA measurements plus assistance data (e.g., cell latitude/longitude) to estimate the UE's location.

The AD is a subset of the micro-BSA 520. For example, it may consist of the parameters of 50 cells.

BSA→micro-BSA→AD 700,000 cells→1,000 cells→50 cells

The UE 510 may have one or more micro-BSAs 520. For example, the UE 510 may have more than one micro-BSA 520 to provide service for a few different areas around a town that the UE 510 frequents. To initialize the device, the UE 510 communicates with a BSA server 511 via the micro-BSA cloud assist server 516. It informs the BSA server 511 of the ECGI of the serving cell, and possibly the ECGI's or PCI's of neighbor cells. For example, the UE 510 might inform the BSA server 511 via the micro-BSA cloud assist server 516 that the serving cell ECGI is "xyz", and that the UE 510 would like a micro-BSA 520 of 200 cells. The parameters that make up a cell is roughly 120 bits, so a 200-cell micro-BSA 520 would be 200*120/8/1000=3 kilobytes. These 3 kBs of BSA information are retrieved from the BSA 512 by the BSA server 511 and then communicated by the micro-BSA cloud assist server 516 in the downlink channel to the UE 510 and stored.

With the micro-BSA 520 instantiated on the UE 510, the UE 510 effectively has access to a "mini-map" of those 200 cells. Since the UE 510 is aware of its location, the UE 510 knows if it remains in the service area of these 200 cells. If the UE 510 roams outside of these cells it might want to request a new micro-BSA 520. If the UE 510 is stationary and not detecting as many cells as expected given the contents of the current micro-BSA 520, it might be the case that the cell topology has changed and it might be a good time to get the micro-BSA 520 refreshed.

The ECGI of the serving cell can provide a seed estimate of the UE 510 from which to derive a set of micro-BSA cells. That seed estimate can simply be the transmission point of the serving cell. With additional neighbor information, the server can derive a better seed estimate, like the centroid of the serving and surrounding cells.

To determine a good set of AD cells, the seed estimate can be something similar as the seed estimate used to get the micro-BSA 520 from the BSA server 511; that is, something akin to a cell ID. Or, suppose the UE 510 is roaming. The serving cell may change from one ECGI to another with hand over. At this point, the reference timing on the UE 510 will likely change as the UE 510 synchronizes to some new serving cell. This time change can be logged to adjust the current set of timing measurements for the current set of cells being monitored. The positioning assistance data calculator 524 on the UE 510 will likely want to obtain a new set of AD cells from the micro-BSA 520. The seed estimate for new AD can be the most-recent UE location estimate (using OTDOA, for example). If the new serving cell is in the micro-BSA 520, then no further action is needed. If not, the UE 510 will need to retrieve a new micro-BSA 520 from the BSA server 511, which hosts or has access to the BSA 512. If the UE 510 is on the edge of the serving area of the micro-BSA 520 being utilized for AD, the positioning assistance data calculator 524 and/or position estimator 540 may cause the UE 510 to retrieve, from the BSA server 511, BSA information corresponding to a new micro-BSA 520.

It may be desired for the BSA server 511 to keep track of the cells for which information is stored in the micro-BSA 520 of the UE 510. That way the BSA server 511 can give the UE 510 information for new cells that are not duplicates of the current micro-BSA. It may be advantageous to send just differences from the prior micro-BSA when populating a new micro-BSA.

Again referring to FIGS. 5 and 6, the improved assistance data 616 is made possible by the improved seed estimate in 612. The feedback 532 also allows for improved assistance data. For example, consider the case when the serving cell is significantly farther from the UE 510 than other surrounding cells. This can happen, for instance, when the serving cell is transmitting at high power on top of a hill that is in a line of sight with the receiver of the UE 510. The receiver of the UE 510 may sense this hilltop cell to be of the highest signal-to-noise-plus-interference ratio (SINR) of all its surrounding cells and use it for its serving cell. In this example, there may be other closer-by cells, possibly transmitting at lower power, or not in a line of sight. Setting the initial seed estimate to the serving cell location 604 may be suboptimal in this case since the serving cell is relatively far from the target receiver of the UE 510. This condition could exclude cells that are indeed much closer than the serving cell.

The current state of the art will suffer from this scenario since the assistance data is derived at a location server, not adaptively on a device such as the UE 510 configured with the micro-BSA(s) 520, which is a superset of the assistance data. In embodiments of the present system, measurements 530 are provided as feedback 532 to the positioning assistance data calculator 524, offering an efficient adaptation and improved location accuracy.

In this described scenario of a far-away serving cell, the timing measurements in 530 may detect closer-by cells (with a delay negative relative to the serving cell timing). For example, a high quality (PAPR, or SINR, low variance, etc.) negative TOA of 1000 meters can be present in the list of detected cells. This implies that the negative TOA cell is 1000 meters closer to the UE than the serving cell. Re-seeding the assistance data calculation by incorporating this information can be beneficial. For example, the closer-by cell latitude/longitude coordinates can be used as the new assistance data seed estimate 612.

Similarly, the timing advance (TA) in the receiver can be used to detect a far-away serving cell. In a cellular system, the TA is used to signal a far-away receiver to transmit early so the far-away and closer-by device uplink transmissions arrive at the base station receiver around the same time. The assistance data calculator can therefore use TA information available in the host modem 1224 in FIG. 12 to improve the assistance data generation strategy. For example, if the TA is high, implying a far-away serving cell, the number of cells in the assistance data for TOA measurements may be expanded to farther distances from the serving cell. Then, as closer-by TOAs are detected, the assistance data can be recalculated as described above.

Multiple Onboard Micro-BSAs and Tracking Use Cases

The present system advantageously allows a device such as the UE 510 to specialize in location services for a broader range of use cases. The current state of the art only supplies 10s of cells in the assistance data, intended primarily for the single use case of emergency services (e911). This current state of the art is not well suited for roaming use cases, for example. The present system solves this problem with the use of micro-BSA(s) 520 stored on the UE 510. For a UE implemented as a specialized location device, more memory may be allocated on the UE 510 to storing the micro-BSA(s) 520. This allows for roaming use cases and minimizes interaction with the micro-BSA cloud assist server 516 or other elements of the network 514. For example, 15 bytes per cell is sufficient to represent the cell parameters in the assistance data. This representation includes parameters such as, for example, physical cell ID (PCI), cell latitude/longitude coordinates, etc. Instead of storing 24 cells as is done in the current state of the art, the UE 510 may store 1000 cells using 15 kilobytes of memory. Assuming a cell density of 1 cell per square kilometer, the micro-BSA(s) 520 may have a location service area of 1000 square kilometers, thus allowing the UE 510 to roam. An example use case here is the tracking of rental scooters where the devices roam around a city. The operator of these scooters may desire to track their location both indoor and outdoor and with the present system this feature can be delivered at a low cost.

Figure 7:
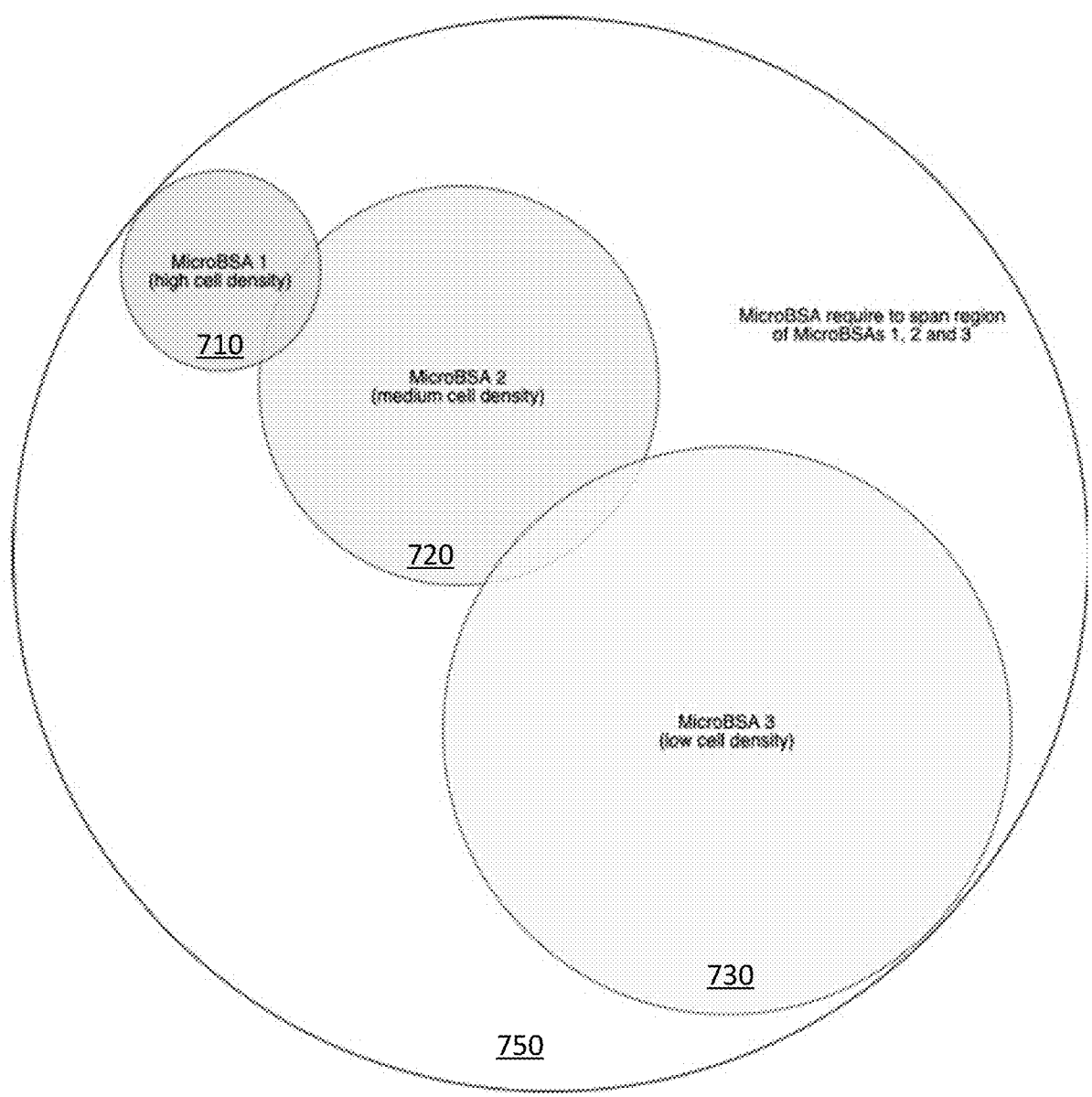
FIG. 7 is an illustration of the geographic footprints associated with multiple micro-BSAs stored on the UE included in the system of FIG. 5.

Turning now to FIG. 7, an illustration is provided of the geographic footprints associated with multiple micro-BSAs 520 stored on the UE 510. For some use cases it may be desired that the UE 510 store multiple micro-BSAs to span a greater geographical region. As shown, information concerning cells located in a first geographic footprint 710 corresponding to a region of high cell density is stored within a first micro-BSA $520_1$. Similarly, information concerning cells located in a second geographic footprint 720 corresponding to a region of medium cell density is stored within a second micro-BSA $520_2$ and information concerning cells located in a third geographic footprint 730 corresponding to a region of low cell density is stored within a third micro-BSA $520_3$.

In this use case exemplified by FIG. 7, the UE 510 is known to commonly travel across the first geographic footprint 710, the second geographic footprint 720 and the third geographic footprint 730. By storing a micro-BSA $520_1$, $520_2$, $520_3$ for each geographic footprint 710, 720, 730, the UE 510 has all the needed cell information to perform location functions without interacting with the micro-BSA cloud assist server 516 or other elements of the network 514. And this can be done using less storage than storing the superset of the geographic footprints 710, 720, 730, which is represented by circle 750. As the UE 510 roams throughout the geographic footprints 710, 720, 730, the UE 510 intelligently derives its assistance data by making cell selections across the multiple locally-stored micro-BSAs $520_1$, $520_2$, $520_3$.

A specific use case exemplified by FIG. 7 involves a company's tracking of tools used on different job sites. For example, a construction company may have a high-valued generator or reciprocating saw that travels from job site to job site. Assume the company has three job sites (respectively located within geographic footprints 710, 720, 730) and a manager has misplaced a tool. In this case the manager may use a small tracker (an implementation of the UE 510) attached to the tool to determine its location.

Artificial Intelligence (AI) Assisted Micro-BSA Management

For use cases where a device, such as the UE 510, is traveling across large distances (e.g., while attached or associated with a container in a truck traversing interstate highways in the United States), the UE 510 can sense high mobility (with Doppler estimation, for example) and the cell parameter information downloaded to the device micro-BSA 520 can be accordingly adapted. For example, in this case it may be advantageous to provide parameter information in the micro-BSA 520 for cells that are on the expected route of the truck.

In use cases such as this a micro-BSA "artificial intelligence" (AI) management module 550 can assist in the management of the information included in the micro-BSA(s) 520. For example, the micro-BSA AI management module 550 can implement pattern recognition algorithms capable of identifying with high likelihood that when the UE 510 is located on an interstate highway and traveling at a certain velocity it will best benefit from a certain set of micro-BSA cells. Similarly, when the UE 510 is determined to be stationary in a city center the UE 510 will likely benefit from a different strategy. In this latter case, the UE 510 may be attached to a smart meter, traffic sign, or Automatic Teller Machine (ATM) cash machine that is not intended to travel for the life of the UE 510. For these application the micro-BSA download management effected by the AI management module 550 will be different than for the high-velocity interstate traveling use case.

This management of micro-BSA information using AI can benefit subterranean use cases. For example, if the device serving cell is underground in a metropolitan subway system, then the AI management module 550 may consider only providing underground cells in the micro-BSA 520. Considering another use case, the AI management module 550 can learn from patterns in commuting. For example, a commuter line will have a finite number of transfer routes. The download of information to a micro-BSA 520 of a UE 510 being transported by the line may benefit by including cells in the most common transfer routes, and this can depend on the time of day/week. As another example, the AI management module 550 may be able to "learn" that devices traveling at speed on a particular highway during a particular time (e.g., on Interstate 8 at 9 am on a Tuesday 20 miles east of El Centro) have a 90% likelihood of ending up in Glendale, Ariz. This knowledge may then be utilized to download information to the micro-BSA 520 pertaining to cells more likely to be utilized by the UE 510 when transiting such a highway at the particular time.

In other embodiments the AI management module 550 within the BSA server 511 may be complemented by an optional AI management module 552 disposed within the UE 510. The an optional AI management module may be configured to perform at least some of the processing otherwise performed by the AI management module 550.

Bad Cell Detector

Figure 8:
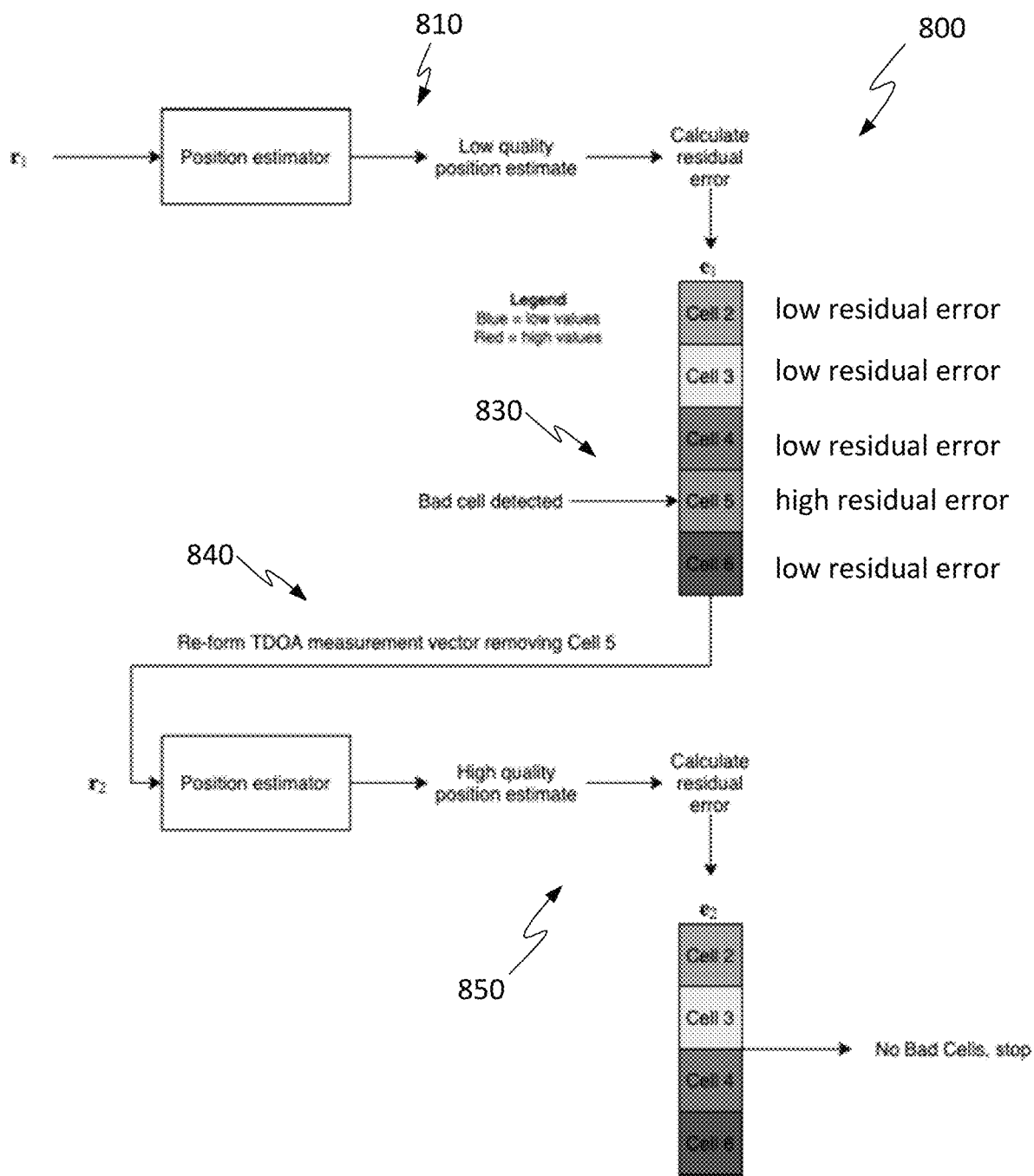
FIG. 8 illustrates a Bad Cell Detection process implemented by a Bad Cell Detector for improving quality of position estimates produced by a position estimator included in the UE of FIG. 5.

FIG. 8 illustrates a Bad Cell Detection process 800 implemented by a Bad Cell Detector 544 (FIG. 5) for improving quality of position estimates produced by the position estimator 540. As described above, the TDOA residual error vector provides insights into the quality of the position estimate and these insights may be leveraged in the process 800. First, a position estimate is computed using the TDOA measurements in a first TDOA measurement vector $r_1$ (stage 810). The resulting position estimate is used to construct the TDOA residual error vector $e_1$ (stage 820). Cell 5 is detected to be, and labeled, a "Bad Cell" because of its relatively high error value (stage 830). Cell 5 is then removed to construct a new TDOA measurement vector $r_2$ (stage 840). The resulting position estimate using this measurement vector is improved (stage 850). This Bad Cell Detection process 800 can be coupled with other criteria to determine the quality the position estimate. For example, a minimum number of cells may be required. For 2D hyperbolic TDOA positioning, measurements from at least three distinct cell sites are required. It may be advantageous to require more than three distinct cells sites for extra redundancy and added robustness in the position calculation. Moreover, the GDOP between the estimated UE location and the cells used for positioning can be calculated. If the GDOP raises above a certain threshold it may be determined that the environment is not well suited for hyperbolic TDOA. In this case the position estimate may return no result, and error result, or may fall back to another positioning method like E-CID. The threshold setting for the residual error, the minimum number of cells, and the minimum GDOP can be dynamically determined, or multiple static configurations can operate independently in parallel. For example, config A may be a strict configuration, config B may be a less strict configuration, and config C may be E-CID. At reporting time, the position estimate of config A is used if available, otherwise config B is used if available, otherwise config C is used as a fall back. Alternatively the thresholds can be set dynamically. For dense cellular environments where many cells are measured, the minimum threshold can be raised, for example. For coastal environments where cells locations are skewed in one direction (many on land, with few if any at sea) the GDOP threshold maybe start low, but gradually increase to loosen the requirements for this given environment. E-CID can incorporate power measurements per v-shift to obtain RSRP for multiple surrounding cells, and cell TOA detectability rates can be incorporated to obtain a determination of the UE angle relative to the serving cell.

The UE 510 may be configured to leverage feedback from the Bad Cell Detector 544 to improve the assistance data 526. In the specific case of FIG. 8, the fact that Cell 5 is deemed poor by the Bad Cell Detector 544 is useful information that may be included in the feedback 534 to the positioning assistance data calculator 524. In this way information relating to Cell 5 may be excluded from inclusion in future assistance data 526.

Again considering the example of FIG. 8, "Cell 5" may be deemed of low quality due to challenging multipath channel conditions where the TOA estimation is compromised. Alternatively, Cell 5 may be relatively out of synchronization relative to other cells in the group. In the case of the later, the Bad Cell Detector 544 provides an algorithmic means of dealing with networks that are not well synchronized. Specifically, by excluding a few cells in the list that are relatively out-of-sync with the other cells, improved performance is achieved. Moreover, the level of asynchronization can be a relatively static quantity to be estimated and compensated for in the position estimator 540.

Another feature of the present system is to exclude cells in the assistance data 526 that are rarely or never detected. Attempting to detect cells that are not detectable wastes computing resources of the UE 510. Therefore there are efficiency gains to be had by ignoring cells that are difficult to detect. The estimation algorithms executed by the position estimator 540 can monitor which cells are being detected and which cells are not being detected. This information can be included in the feedback 534 provided to the positioning assistance data calculator 524 in order to enable incremental efficiency improvements.

Good Cell Selector

In alternative embodiments a position estimation method may be performed by a Good Cell Selector (GCS) 560 of the position estimator 540 in lieu of the method performed by the Bad Cell Detector 544. First, the Good Cell Selector 560 ranks the estimated TOA of the surrounding cells in terms of quality. The quality metric might be based on signal-to-noise-plus-interference ratio (SINR) or peak-to-averagepower ratio (PAPR) of the correlator output. See, e.g., Thompson et al., "Communication System Determining Time of Arrival Using Matching Pursuit," U.S. Pat. No. 10,749,778. Alternatively, the estimated TOA of the surrounding cells may be ranked by peak-to-average power ratio of the pseudospectrum in the multiple signal classification (MUSIC) super resolution algorithm. See, e.g., X. Li and K. Pahlavan, "Super-Resolution TOA Estimation With Diversity for Indoor Geolocation," *IEEE Transactions on Wireless Communications*, vol. 3, no. 1, January 2004.

It is advantageous to use the highest quality TOA as the RSTD reference cell, and the remaining TOAs as the RSTD neighbor cells. This sets the index i(m) to the highest quality TOA and the RSTD neighbor cell indices j(m) to the remaining cells. Of the M available TDOA measurements, the objective of the Good Cell Selector (GCS) is to select a subset of P≤M good measurements. This assumes some of the measurements are poor, and this can be attributed to a variety of error sources, including transmit timing error, non-line-of-sight (NLOS) bias, and TOA estimation error. One procedure to identify good cells is to start with the first few highest quality measurements to form an initial location estimation by minimizing the cost function Q(x). For 2D hyperbolic estimation, at least two TDOA measurements are required from 3 geographically distinct cells. So for the initial estimate, at least P=2 high quality TDOA measurements are required that correspond to three geographically distinct cells.

With the initial estimate established, the (P+1)st TDOA measurement is included in r and the new Q(x) is formed and minimized. With the inclusion of the new cell, the updated position estimate is studied to determine if including the new cell is beneficial. This can be done a variety of ways. For example, the quantity $c\sqrt{Q(x)}/P$ is a measure of the minimum residual error in meters. If this measure exceeds an established threshold with the inclusion of the new cell, the new call can be excluded from the list of used cells. Another method is to study the contour of Q(x). If a clear global minimum is identified with a small minimum region, the new cell may be deemed good. On the other hand, if a secondary local minimum is present (thus making the overall minimum less distinct), the new cell may be identified as not good.

As the Good Cell Selector 560 trials new candidate cells (i.e., TDOA measurements), it is advantageous to use the cells in their ranked order of quality. It may also be beneficial to select the next trial cell that improves the estimate geometry (i.e., reduces the geometric dilution of precision (GDOP)). Given the current UE estimated location, surrounding cells can be categorized in terms of circular sectors. Cells in underrepresented sectors can be prioritized for improved geometry. This circular sector method is similar to the selection of assistance data cells using the Circular Sector Assistance Data (CSAD) described with reference to FIGS. 9-11. The estimated UE location is placed at the origin of the circular sectors, and, for example, six sectors are established around this origin. Suppose cells in r are from Sectors 0 through 3, but there are not cells in r from Sectors 4 and 5. In this case, it may be beneficial to introduce the next cell candidates from the underrepresented Sectors 4 and 5.

The Good Cell Selector 560 continues execution until a desired number of cells are included in the position calculation. This stopping criteria may be established with a threshold on P, or once a desired GDOP level is attained, or once an uncertainty region from the contours in $c\sqrt{Q(x)}/P$ is confined to a desirable level, or by some other means. The stopping rule is not limited to these criteria, of course, and a mix of different criteria may be effective.

Micro-BSA Refinements Responsive to Measurements

In one embodiment the on-device micro-BSA 520 can be refined and pruned with feedback 532 from the radio condition measurements and position estimates performed by the module 530. For example, if a particular cell is not detectable it may be beneficial to remove the cell from the micro-BSA 520 to free memory. Likewise, if a cell is consistently deemed "bad" in the Bad Cell Detector 544, it may also be removed.

BSA Request Optimizations

Additional BSA information is not required if the position estimator 540 is generating reliable estimates, as stated above. Other methods for determining if new BSA information is required include:

Cell statistics tracking (power received, timing measurements, etc.). If these do not change significantly over time, the UE 510 can assume that the network configurations have not changed, and no BSA update is needed.

Cell scanning. The UE 510 can scan for all cells (PCIs, PRS IDs). If cells are detected that are not in the micro-BSA 520, this can trigger an update of the micro-BSA 520 in which additional information is requested from the BSA 512.

BSA updates responsive to UE mobility. When the UE 510 is detected as being highly mobile, with a Doppler estimator, for example, or with a high rate of serving cell changes, the efficiency gains may be had by pausing BSA updates until lower speeds are achieved. This depends on the number of store cells in the micro-BSA 520. For example, if 1000 cells are stored and the cell density is 1 cell per squared kilometer, then high mobility is supported in the 1000 square kilometer serving area. However, if 100 cells are stored and the cell density is 10 cells per squared kilometer, high mobility could result in the information in the micro-BSA 520 becoming dated. If a position update is required by the application then the micro-BSA 520 can be updated to provide a positioning fix during the time of high mobility. However, if the application is not requesting a position update, it may be advantageous to pause updates of the content of the micro-BSA 520 until the UE 510 returns to a stationary state.

Reduced Latency

In existing positioning applications such as, for example, e911, requests are made regarding the location of the UE 510. Such requests conventionally trigger the full process described in the Background section; that is, assistance data delivery from the network to the UE, measurements on the UE, transfer of measurements from the UE to the network, and, finally, location estimation and delivery to the application. The latency involved in such a conventional approach may be 10s of seconds.

The present system reduces the time latency between the application position request and position delivery. Since the UE 510 is location aware, the delivery can be "instantaneous": on the order of 10s of milliseconds if the application is hosted by the micro-BSA cloud assist server 516 or is otherwise cloud-based in the network 514. If the application is executed by the UE 410, the time required to transmit the UE location latitude and longitude coordinates in the uplink may be on the order of 10s of nanoseconds. The location awareness of the UE 510 is possible with the present system due to the UE-based positioning method. The intelligent handling of the micro-BSA 520 allows for the UE 510 to require no interaction with the micro-BSA cloud assist server 516 or other elements of the network 514 in the event of a position request. The UE 510 can thus periodically update its position estimate with no interaction with the micro-BSA cloud assist server 516 or other elements of the network 514 in between position requests. This type of location awareness on the part of a mobile device between positioning requests to a network is not made possible by existing approaches. For example, it is possible that the position of a conventional UE traveling at high velocity could change substantially between the times of position requests made to a network.

When either a cloud-based application or an application executed on the UE 510 requests a position, the "instantaneous" position estimate is immediately available by the present system and delivered to the application. With the estimate, a time stamp may also be supplied, signaling to the application when this last position update was performed. For example, the position estimate may be updated in the background once per hour. Consider the case of a manager of a tool company wishing to find the location of a company generator. In this case a breadcrumbing application may inform the manager that the device was at job site ten minutes prior. This may be a sufficient amount of information for this use case and the device requires no additional interaction with the network. Or, the manager may wish to know the location of the device at the present time, so the tracking device (e.g., a simplified implementation of the UE 510) may update the location estimate accordingly.

Geometry Optimizations in Micro-Bsa and Assistance Data Selection

Figure 9:
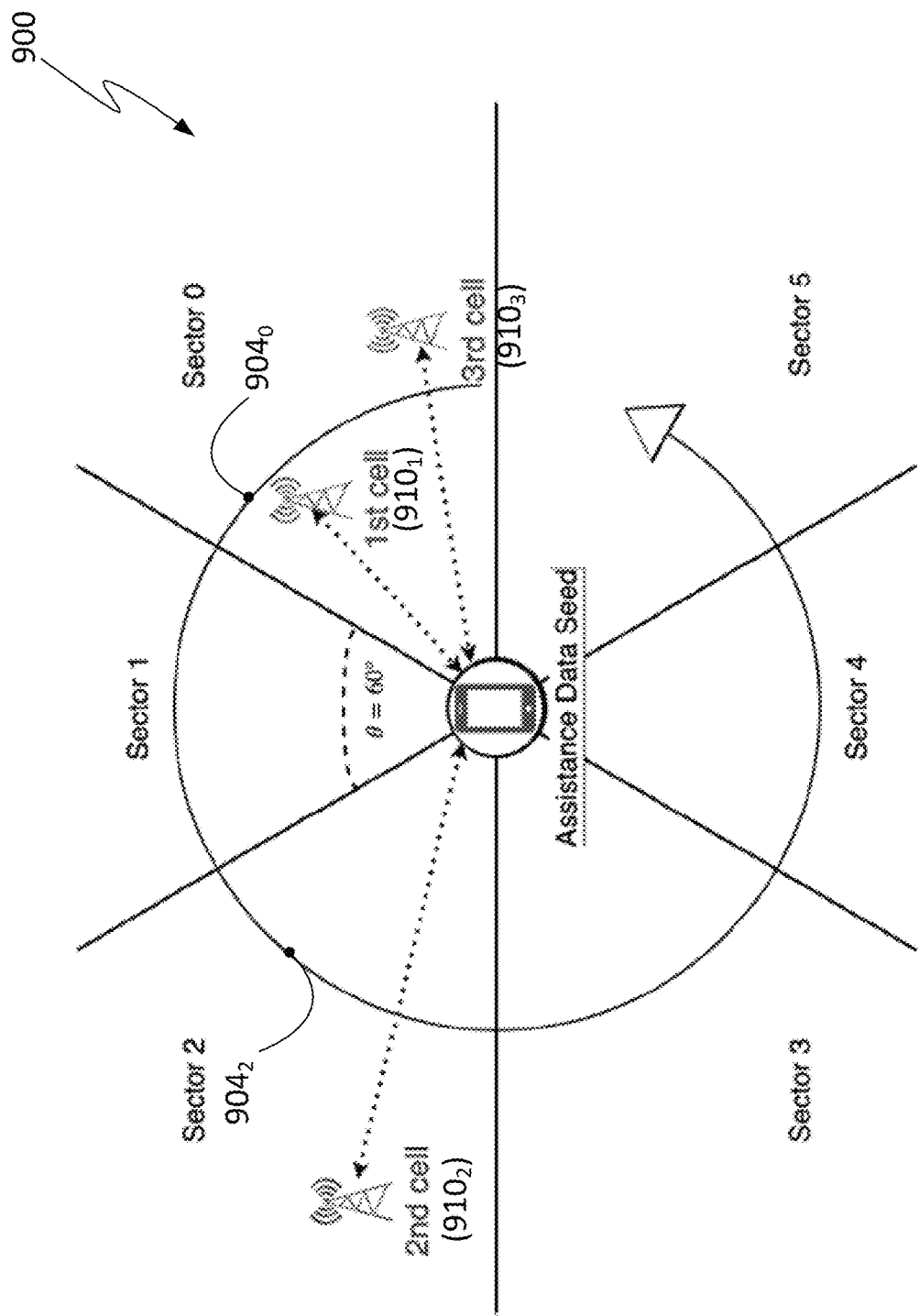
FIG. 9 illustrates a method of Circular Sector Assistance Data Generation useful in lowering GDOP in accordance with the disclosure.
Figure 10:
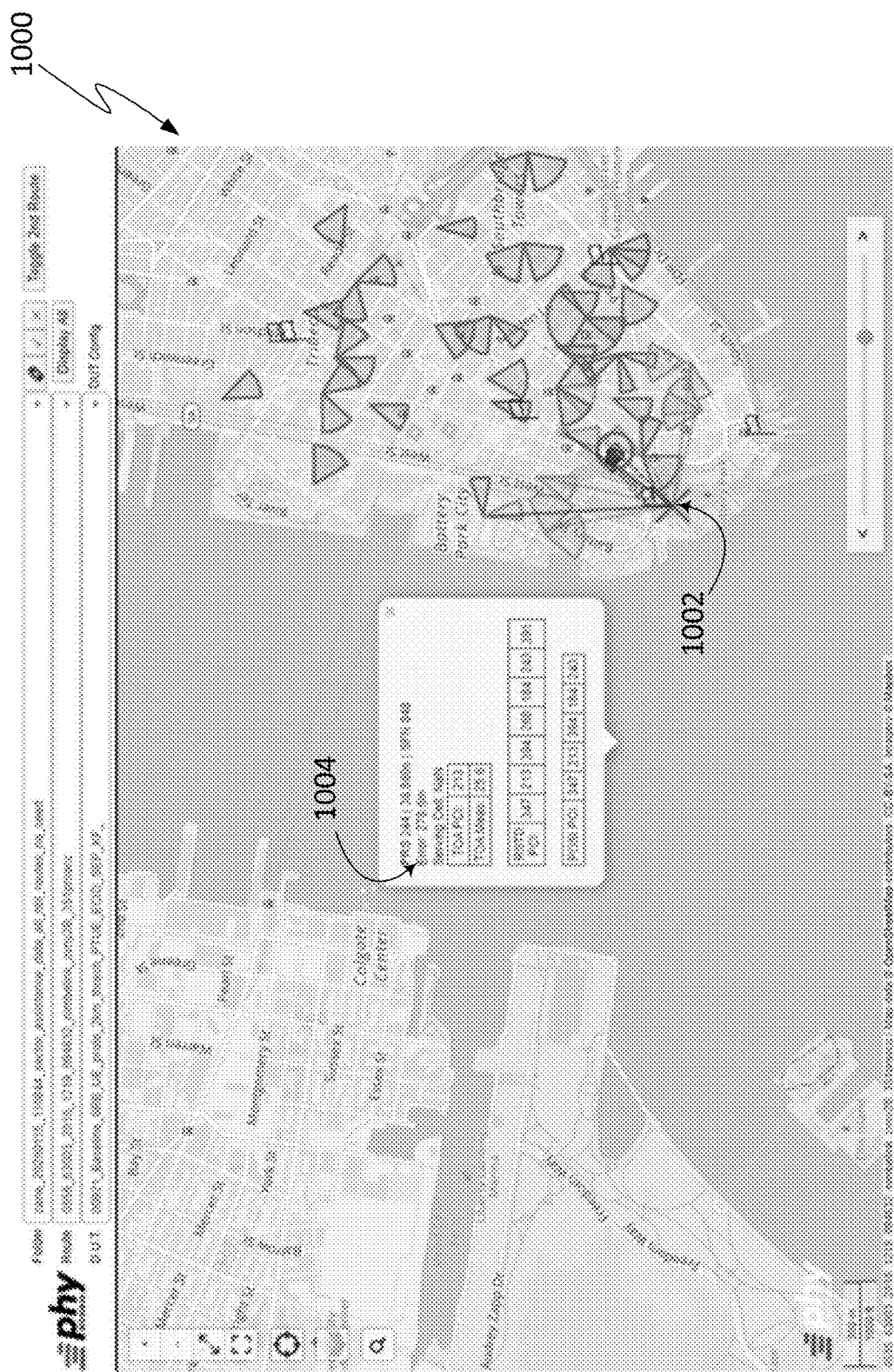
FIG. 10 shows a screenshot capture of a map of a portion of New York City which illustrates an arrangement of cells lacking geometric diversity.
Figure 11:
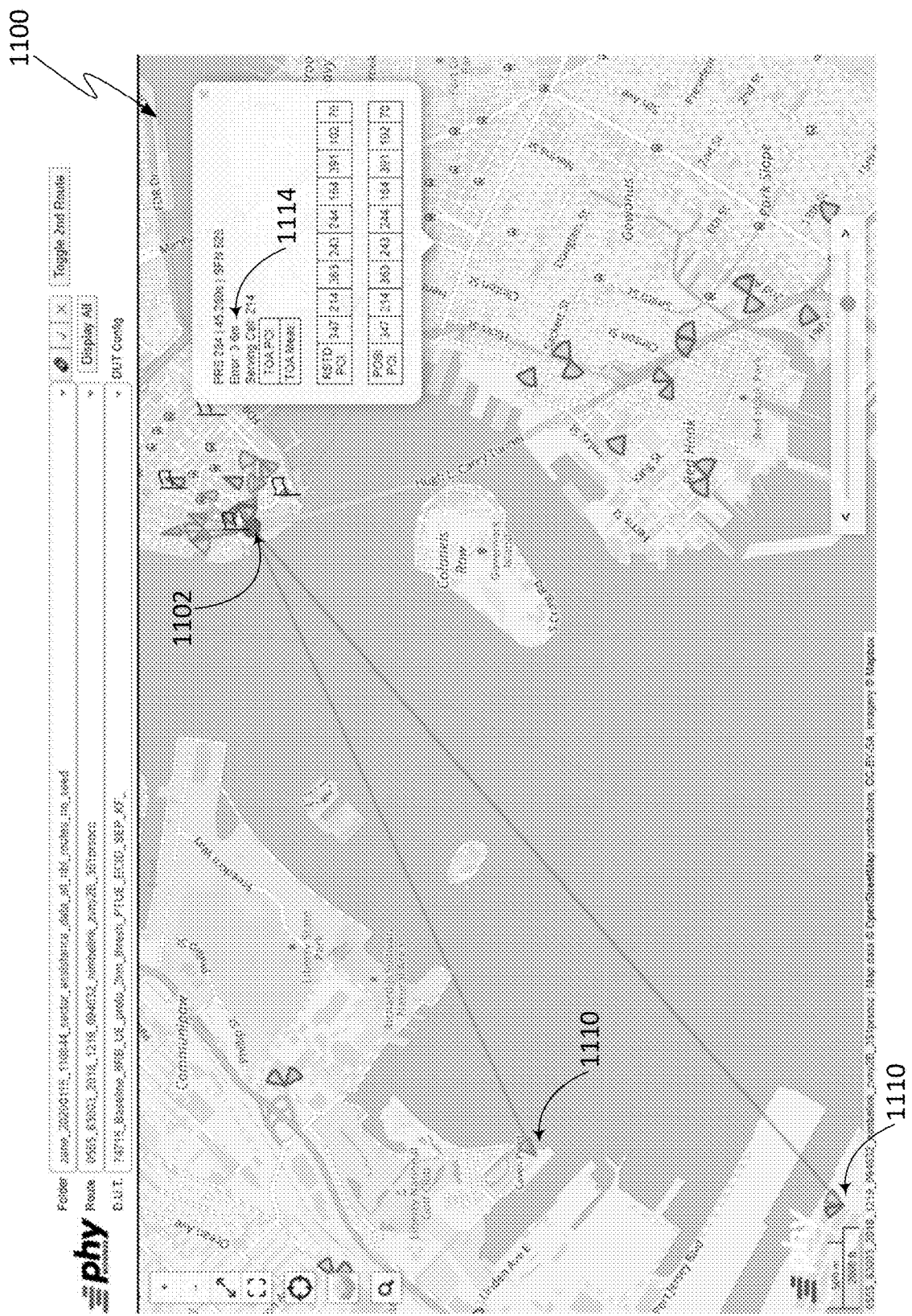
FIG. 11 is a screenshot capture of a map which illustrates an arrangement of cells selected in accordance with a circular sector assistance data generation method in order to have improved geometric diversity.

Attention is now directed to FIGS. 9-11, to which reference will be made in describing geometry optimizations in micro-BSA and assistance data selection in accordance with the disclosure. In one embodiment the positioning assistance data calculator utilizes intelligence in the selection of micro-BSA information and assistance data 526. Cellular position estimation is sensitive to the geometric dilution of precision (GDOP). Accordingly, in one implementation the assistance data 526 is generated using a seed estimate of the location of the UE 510 as described above. However, simply selecting the N nearest cells to the UE seed estimate may be a suboptimal strategy in terms of geometry. It can be advantageous to select cells that improve GDOP and the overall stability of the position calculation.

FIG. 9 illustrates a method 900 of Circular Sector Assistance Data Generation useful in lowering GDOP in accordance with the disclosure. Using the assistance data seed as the center, six circular sectors 904 are formed with equal central angles of 60°. The assistance data 526 is built starting in sector 0 and ($904_0$) rotating counter-clockwise, successively adding 1 cell from each sector. In the example of FIG. 9, the first cell $910_1$ included in the assistance data is in Sector 0 ($904_0$). The second cell $910_2$ is in Sector 2 ($904_2$) even though there is a closer cell ($910_3$) in Sector 0. The cell $910_2$ in Sector 2 is prioritized since it provides a more geometrically diverse set. After the Sector 2 cell is added, then the third cell $910_3$ is in Sector 0.

Turning to FIG. 10, there is illustrated a screenshot capture of a map 1000 of a portion of New York City. The map 1000 shows a location 1002 of a UE, which is a challenging location from the perspective of positioning since there are no immediate cell sites on the west and south side of the UE. In this case a suboptimal method would be to simply add all the information associated with cells closest to the location 1002 to the assistance data seed. However, since these closest cells are only to the north and east of the location 1002, this approach does not provide geometric diversity. As a result the GDOP associated with this approach is poor and the resulting position estimate error 1004 is approximately 280 meters.

FIG. 11 illustrates screenshot capture of a map 1100 which corresponds to the same screenshot capture illustrated in FIG. 10. However, in this case the circular sector assistance data generation method of the present disclosure is used to select the cells for which assistance data will be used in determining the location 1102 of the UE. The number of cells in the assistance data is the same as in the example of FIG. 10, but the GDOP is lowered since the cell set is more geometrically diverse and includes cells 1110 relatively distant from the location 1102 of the UE. The resulting position estimate error 1114 is reduced from 280 meters to approximate 3 meters.

Additional Network Congestion Relief

The current state of the art assistance data method of LPP/SUPL can add unneeded congestion to the network. For example, in 3GPP Rel-14 the number of muting bits per cell can be as many as 1024. The exchange of 1024 bits per cell may not be required since the number of unique bit sequences will be less than $2^{1024}$. The unique sequences can be stored on the device and a fewer number of bits can be transmitted over the network. In another Rel-13 example using 16-bit muting sequences, there may be only 70 unique sequences. These 70 sequences can be stored in a 70*16=1120 bit lookup table on the device, and $2^{(\text{ceil}(\log_2(70)))}=7$ bits per cell is required to be accessed from the cloud server. This saves 9 bits (56%) in the muting bit sequence download.

Another example is the 3GPP ECGI described in the LPP consisting of MCC (mobile country code), MNC (mobile network code) and a 28-bit cell identity. The MCC and MNC require 24 bits, but those can be common to a network operator. So instead of using the full 52 bits for the 3GPP ECGI, 28 bits for the cell identity can be used for a particular deployment, a 46% reduction.

Data compression algorithms like Lemple-Ziv may also be used to reduce network congestion. The entire micro-BSA bit sequence can be concatenated and bit patterns will be compressed using the compression algorithm since the entropy of the sequence will likely be less than 1.

Exemplary UE Implementation

Figure 12:
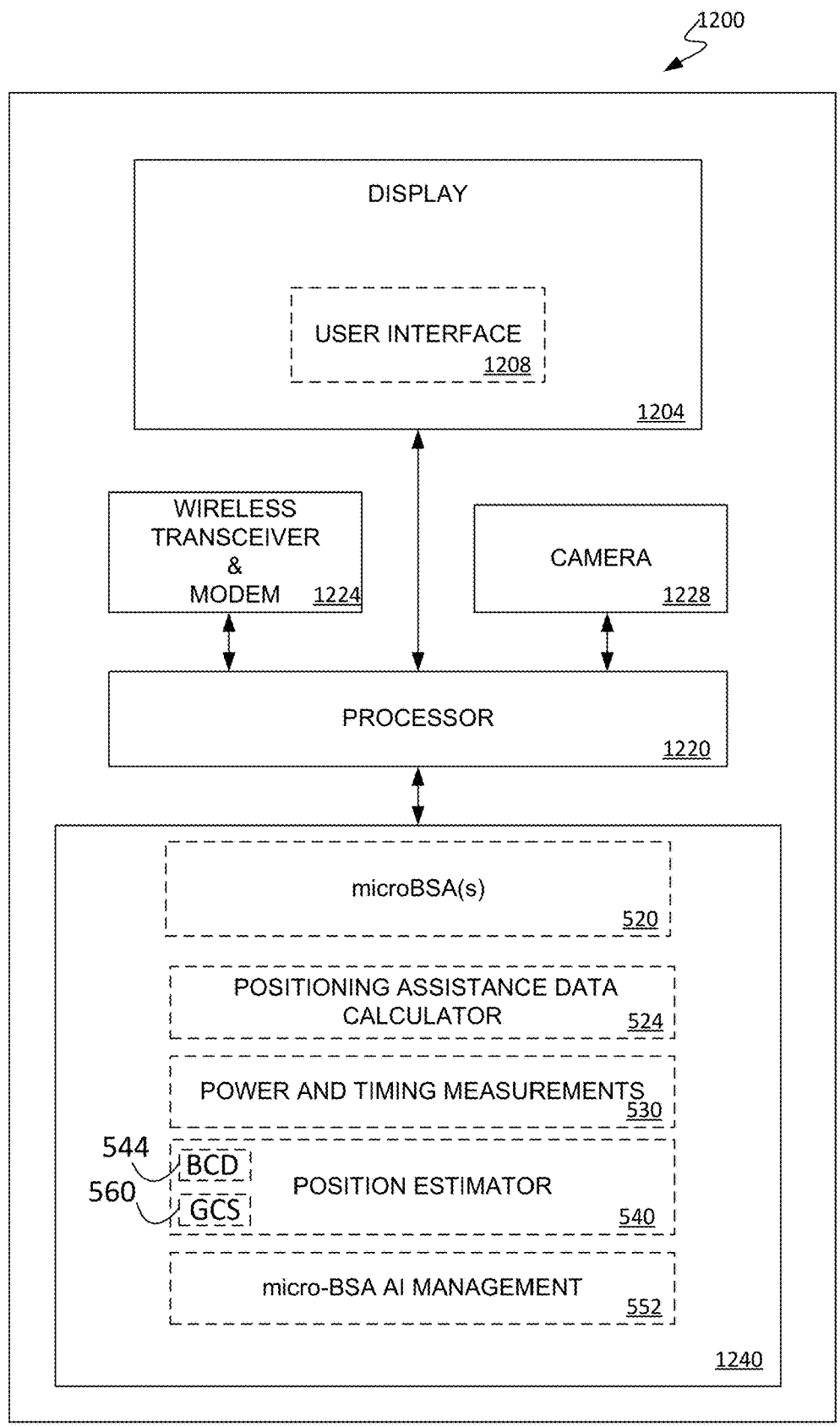
FIG. 12 includes a block diagram representation of a particular implementation of a UE configured in accordance with an embodiment.

Attention is now directed to FIG. 12, which includes a block diagram representation of a particular implementation of the UE 1200, in this case a mobile or cellular phone, configured in accordance with the disclosure. It will be apparent that certain details and features of the UE 1200 have been omitted for clarity, however, in various implementations, various additional features of a mobile device as are known will be included. In addition, those skilled in the art will appreciate that the UE 1200 need not be implemented as a personal communications device, such as a mobile or cellular phone, and in other implementations may comprise a tracking device or the like lacking certain features and characteristics of the implementation of FIG. 12.

Referring to FIG. 12, the UE 1200 includes a processor 1220 operatively coupled to a touch-sensitive display 1204 configured to present a user interface 1208. In other embodiments the user interface 1208 may include a physical keypad or keyboard, audio input device and/or any other device capable of receiving user input or instructions. The UE 1200 includes a memory 1240 comprised of one or more of, for example, random access memory (RAM), read-only memory (ROM), flash memory and/or any other media enabling the processor 1220 to store and retrieve data. As shown, the memory 1240 stores the micro-BSA(s) 520 and programs or including instructions executable by the processor 1220. These modules include the positioning assistance data calculator 524, the power and timing measurements module 530, the position estimator 540 and the micro-BSA AI management module 552.

The UE 1200 includes a wireless transceiver and modem 1224 for communication with a network, such as the network 514, which may include, for example, the Internet, and/or a wireless network such as a cellular network and/or other wired or wireless networks. The UE 1200 may also include a camera 228 and other ancillary modules.

Uncertainty Calculation for UE-Based Positioning

Figure 16:
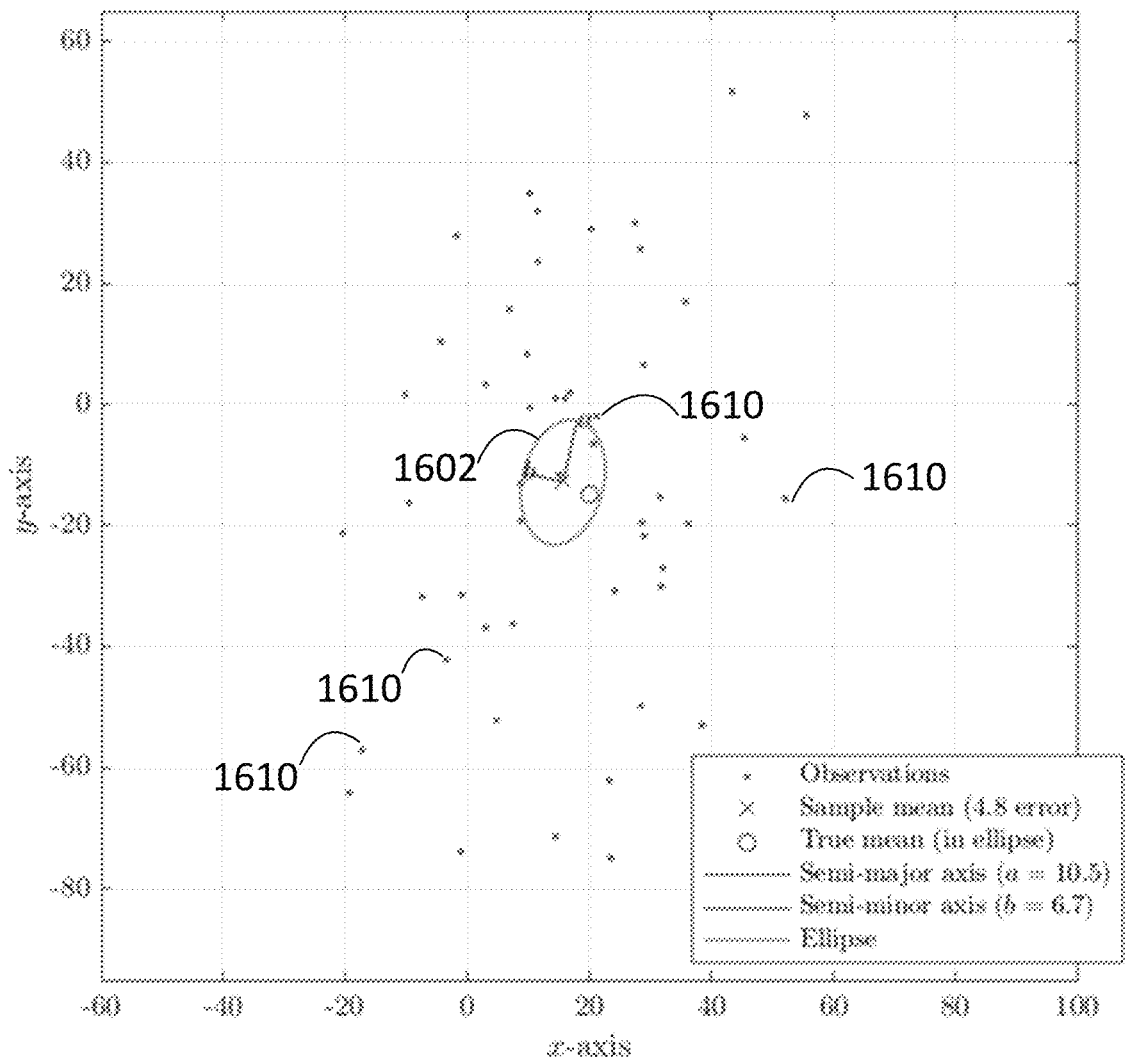
FIG. 16 illustrates an estimated confidence ellipse formed by evaluating multiple observations.

A common approach to estimate the quality of a location estimate is to study many position estimates and form a confidence ellipse. See, e.g., Chew, V. "Confidence, Prediction, and Tolerance Regions for the Multivariate Normal Distribution," *Journal of the American Statistical Association*. 61, 315 (September 1966) 605-617; and Owens, T., and McConville, D. "Geospatial Application: Estimating the Spatial Accuracy of Coordinates Collected Using the Global Positioning System," Tech. rep., National Biological Service, Environmental Management Technical Center, Onalaska, Wis. (April 1996). For example, FIG. 16 shows an example in which multiple (i.e., 50) position estimates (observations 1610) are used to form a confidence ellipse 1602.

Figure 17:
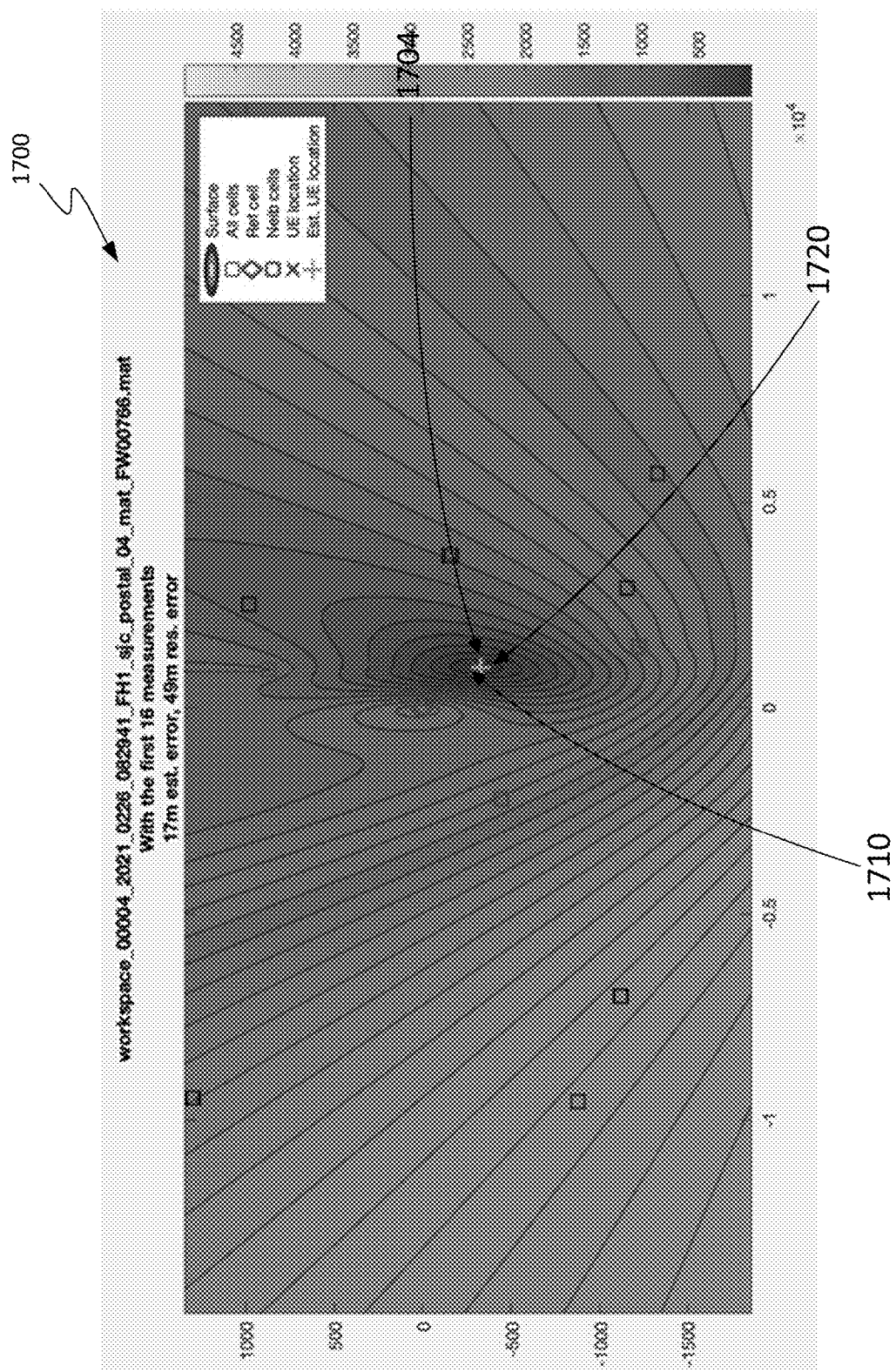
FIG. 17 illustrates an exemplary contour of error surface generated to establish a confidence region.

Turning now to FIG. 17, there is illustrated an exemplary contour of error surface 1700 generated to establish a confidence region in accordance with an embodiment. In this method the contours of $c\sqrt{Q(\hat{x})}/P$ are evaluated as shown in FIG. 17. The darkest blue region 1704 tightly surrounds the true location 1710 of the UE and the estimated location 1720 of the UE. The uncertainty in the estimated location of the UE can therefore be determined by finding the area of the darkest blue region.

The onboard micro-BSA positioning method described herein allows for the confidence region (location estimation uncertainty) to be computed on the UE 510, and this has technical advantages over the state of the art UE-assisted location estimation. For example, performing multiple estimates to form a confidence ellipse can be done using the presently disclosed method without interacting with the network 514, with the UE 510 in a receive-only mode. This method can be performed while the UE 510 is technically in RRC idle, eDRX, or PSM from a data communication aspect. Likewise, the contour of error surface method can be performed on the UE 510 with a single set of TDOA measurements, which in contrast to the method of forming a confidence ellipse advantageously does not require multiple observations.

Hybrid Power-Timing-Based Positioning

In the TDOA positioning method discussed above, timing measurements are used to estimate the location of the UE. As has been explained herein, TDOA is a hyperbolic location method, with each cell pair providing a hyperbola on a two dimensional map. The intersection between multiple hyperbolas is the estimated location of the device. When the number of detected cells is low, a limited number of hyperbolas can increase the uncertainty in the estimate. If only two cells are detected, then only a single hyperbola is draw, greatly increasing the uncertainty in the UE estimated location.

To reduce the uncertainty of location estimates obtained using timing measurements alone, a hybrid power-time positioning method is described in this section. It may be appreciated that a power-measurement-to-distance relationship is typically less clear than a time-measurement-to-distance relationship. As a consequence, a power-only positioning method will typically underperform a timing-only measurement positioning method—so long as there are a sufficient number of detected cells. However, when only two cells are detected, a power-only method can outperform a time-only method, and a hybrid power-time method can perform best.

Suppose the UE performs power measurements on $M_p$ surrounding transmitters. The received signal power measurement for the mth cell can be modeled as follows:

$$r_{p,m} = P_{TX,m} + A_m(\theta_m) - PL_{avg,m}(\|x-x_m\|) + \chi_m,$$

dBm, where m=1, 2, ..., $M_p$, $P_{TX,m}$ is the mth transmitter power in dBm, $A_m(\theta_m)$ is the mth transmitter attenuation factor in dB, $PL_{avg,m}(\|x-x_m\|)$ is the average path loss in dB experienced by the mth transmitted signal traveling $\|x-x_m\|$ meters, x is the unknown UE location, $x_m$ is the known location of the mth transmitter, and $\chi_m$ is a zero-mean Gaussian random variable with standard deviation $\sigma_{p,m}$.

A common path loss model is the so-called log-distance model, where $$PL_{avg,m}(\|x - x_m\|) = PL_{avg,close}(d_0) + 10n \log_{10}\left(\frac{\|x - x_m\|}{d_0}\right),$$

See, e.g., Rappaport, T. S. *Wireless Communications: Principles and Practices*. Prentice Hall, 2002).

$PL_{avg,close}$ ($d_0$) is the close-in path loss in dB at some close-in distance $d_0$ meters, and n is the path loss exponent. The term $\chi_m \sim N(0, \sigma_{p,m})$ characterizes large-scale shadow fading between the transmitter and receiver. The parameter set $\{PL_{avg,close}, d_0, n, \sigma_{p,m}\}$ fully characterizes the model, and they can be fit to empirically obtained data set.

Figure 18:
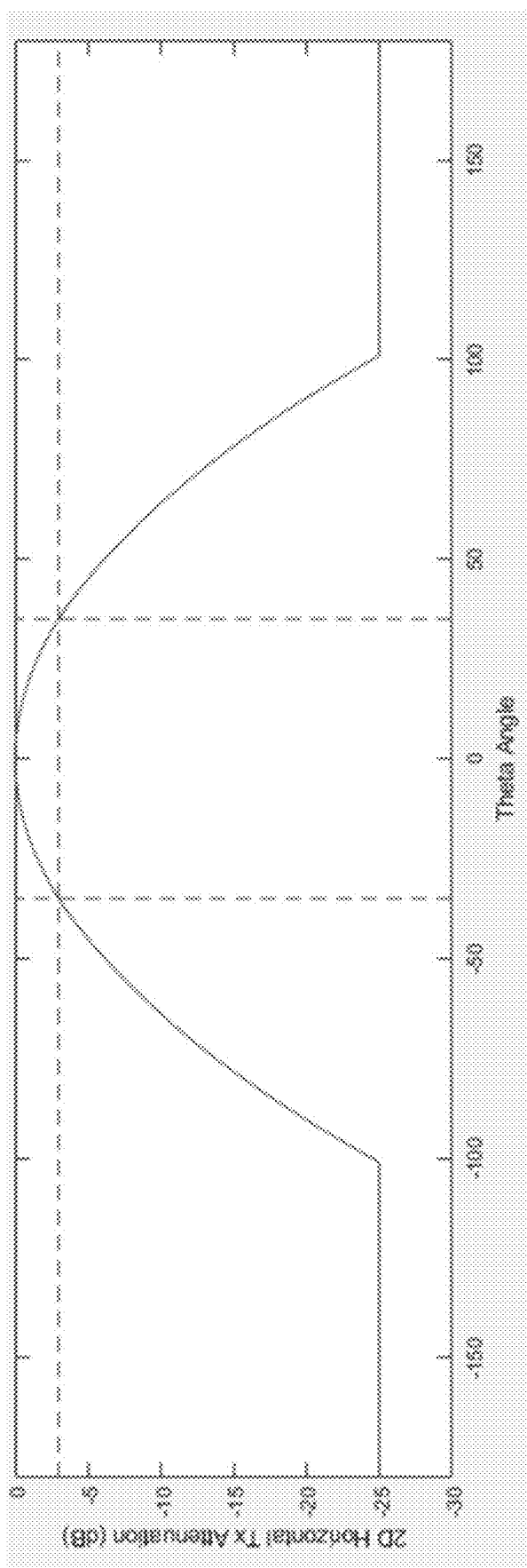
FIG. 18 illustrates an attenuation profile associated with a commonly used attenuation model.

FIG. 18 illustrates an attenuation profile associated with a commonly used attenuation model. See 3GPP TR 36.814: Table A.2.1.1-2 "Further advancements for E-UTRA physical layer aspects". This model may be represented as:

$$A_m(\theta_m) = -1 \times \min\left(12\left(\frac{\theta_m}{B_{3dB}}\right)^2, A_{max}\right).$$

where $\theta_m$ is the angle between the direction of interest (azimuth angle) and the boresight of the antenna, $B_{3dB}$ is the 3 dB beamwidth of the antenna aperture, and $A_{max}$ is the maximum attenuation in decibels. FIG. 18 sets $B_{3dB}=70$ degrees and $A_{max}=25$ dB.

Now, defining $$r_{p,m} = h_{p,m}(x) + n_{p,m},$$

where $$h_{p,m}(x) = P_{TX,m} + A_m(\theta_m) - PL_{avg,m}(\|x-x_m\|)$$

is the average received power, and $$n_{p,m} = \chi_m$$

is the measured power error term due to shadow fading. This formulation allows for the vector form $$r_p = h_p(x) + n_p$$

where the mth element is $r_{p,m}$. This vector form allows for the direct application of the least-squares estimator described above in the timing-based context. A power-based least-squares estimator is therefore:

$$\hat{x}_{LS,power} = \underset{x}{\operatorname{argmin}}\,(r_p - h_p(x))^T(r_p - h_p(x)).$$

Next, to incorporate timing measurements for a power-timing hybrid method, the subscript "t" is introduced where the mth TDOA measurement is $$r_{t,m} = h_{t,m}(x) + n_{t,m},$$

where $h_{t,m}(x)$ is the ground-truth TDOA component and $n_{t,m}$ is the TDOA noise component. The vector form is $$r_t = h_t(x) + n_t.$$

Since the power measurements and the TDOA measurements have different units (dBm for the power measurements and seconds for the timing measurements), exactly how to combine the measurements is unclear and not suggested by prior positioning approaches. In order to circumvent this issue a Gaussian maximum likelihood method is pursued.

Specifically, modeling the shadow fading term $\chi_m$ as $N(0, \sigma_{p,m}^2)$ makes the received power measurement term a Gaussian random variable with variance $\sigma_{p,m}^2$ mean $h_{p,m}(x)$, and a conditional probability density function $$p(r_{p,m} \mid x) = \frac{1}{\sigma_{p,m}\sqrt{2\pi}} \exp\left(-\frac{(r_{p,m} - h_{p,m}(x))^2}{2\sigma_{p,m}^2}\right),$$

$m = 1, 2, \ldots, M_p.$

Similarly, modeling $n_{t,m}$ as $N(0, \sigma_{t,m}^2)$ makes $r_{t,m}$ a Gaussian random variable with variance $\sigma_{t,m}^2$ and mean $h_{t,m}(x)$ with conditional probability density function $$p(r_{t,m} \mid x) = \frac{1}{\sigma_{t,m}\sqrt{2\pi}} \exp\left(-\frac{(r_{t,m} - h_{t,m}(x))^2}{2\sigma_{t,m}^2}\right),$$

$m = 1, 2, \ldots, M_t.$

Assuming statistical independence across the power measurements and across the time measurements, the joint conditional probability of all the measurement is $$p(r_{p,1}, r_{p,2}, \ldots, r_{p,M_p}, r_{t,1}, r_{t,2}, \ldots, r_{t,M_t} \mid x) = [\pi_{m_p=1}^{M_p} p(r_{p,m_p} \mid x)] \times [\pi_{m_t=1}^{M_t} p(r_{t,m_t} \mid x)]$$

A power-time hybrid Gaussian maximum likelihood estimator then becomes $$\hat{x}_{GML,hybrid} = \underset{x}{\operatorname{argmax}}\, p(r_{p,1}, r_{p,2}, \ldots, r_{p,M_p}, r_{t,1}, r_{t,2}, \ldots, r_{t,M_t} \mid x)$$

$$= \underset{x}{\operatorname{argmax}} \left[\prod_{m_p=1}^{M_p} p(r_{p,m_p} \mid x)\right] \times \left[\prod_{m_t=1}^{M_t} p(r_{t,m_t} \mid x)\right]$$

$$= \underset{x}{\operatorname{argmin}} \left[\sum_{m_p=1}^{M_p} \frac{(r_{p,m_p} - h_{p,m_p}(x))^2}{2\sigma_{p,m_p}^2}\right] + \left[\sum_{m_t=1}^{M_t} \frac{(r_{t,m_t} - h_{t,m_t}(x))^2}{2\sigma_{t,m_t}^2}\right]$$

$$= \underset{x}{\operatorname{argmin}} \left[(r_p - h_p(x))^T \sum_p (r_p - h_p(x))\right] + \left[(r_t - h_t(x))^T \sum_t (r_t - h_t(x))\right]$$

where $$\sum_p = \operatorname{diag}\left(\frac{1}{2\sigma_{p,1}^2}, \frac{1}{2\sigma_{p,2}^2}, \ldots, \frac{1}{2\sigma_{p,M_p}^2}\right)$$

and $$\sum_t = \operatorname{diag}\left(\frac{1}{2\sigma_{t,1}^2}, \frac{1}{2\sigma_{t,2}^2}, \ldots, \frac{1}{2\sigma_{t,M_t}^2}\right)$$

are diagonal weighting matrices in the power and timing measurements respectively.

Figure 19A:
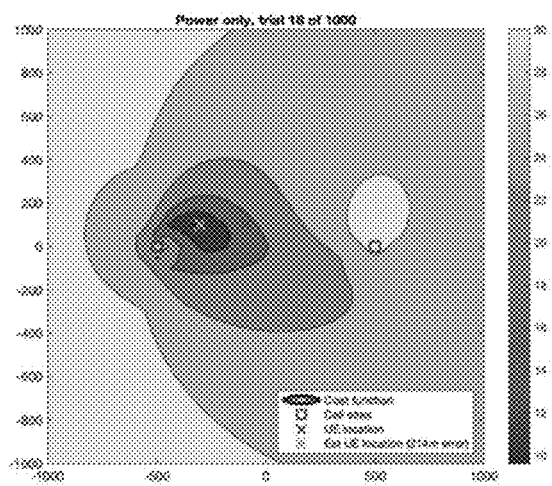
FIGS. 19A-19C depict the results of simulations performed using a power-time hybrid positioning method in accordance with an embodiment.
Figure 19B:
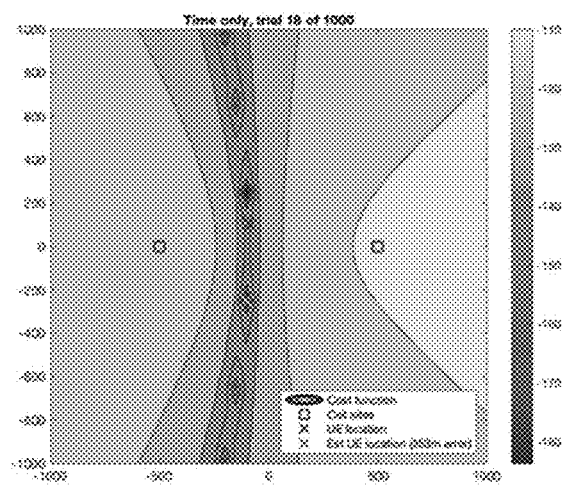
Figure 19C:
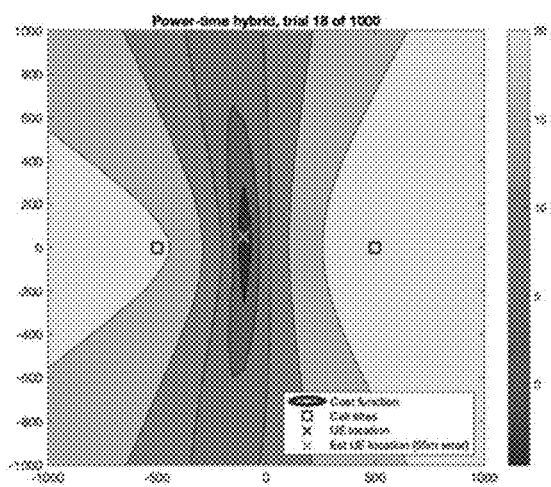

Attention is directed to FIGS. 19A-19C, which depict the results of simulations demonstrating that positioning using the power-time hybrid approach disclosed herein may be advantageous in environments with a limited number of cells. FIG. 19A illustrates results of using power only to estimate the position of a UE within an environment in which the UE receives signals from two cells. FIG. 19B illustrates results of using time only to estimate the position of the UE within the same two-cell environment as FIG. 19A. FIG. 19C illustrates results of using the power-time hybrid approach to estimate the position of the UE within the same two-cell environment. As may be appreciated by comparing the errors associated with the estimated positions in FIGS. 19A-19C, in this example with two cells the power-time hybrid approach demonstrates a benefit relative to the power-only and time-only methods.

Where methods described above indicate certain events occurring in certain order, the ordering of certain events may be modified. Additionally, certain of the events may be performed concurrently in a parallel process when possible, as well as performed sequentially as described above. Although various modules in the different devices are shown to be located in the processors of the device, they can also be located/stored in the memory of the device (e.g., software modules) and can be accessed and executed by the processors. Accordingly, the specification is intended to embrace all such modifications and variations of the disclosed embodiments that fall within the spirit and scope of the appended claims.

The foregoing description, for purposes of explanation, used specific nomenclature to provide a thorough understanding of the claimed systems and methods. However, it will be apparent to one skilled in the art that specific details are not required in order to practice the systems and methods described herein. Thus, the foregoing descriptions of specific embodiments of the described systems and methods are presented for purposes of illustration and description. They are not intended to be exhaustive or to limit the claims to the precise forms disclosed; obviously, many modifications and variations are possible in view of the above teachings. The embodiments were chosen and described in order to best explain the principles of the described systems and methods and their practical applications, they thereby enable others skilled in the art to best utilize the described systems and methods and various embodiments with various modifications as are suited to the particular use contemplated. It is intended that the following claims and their equivalents define the scope of the systems and methods described herein.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded into one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method performed in a mobile device, the method comprising:
receiving, from a base station almanac (BSA) associated with a network server, observed time difference of arrival (OTDOA) assistance data for a first plurality of cells;
storing, within a memory of the mobile device, the OTDOA assistance data as a first micro-BSA;
determining a first position estimate for the mobile device based on time difference of arrival (TDOA) measurements associated with a subset of the first plurality of cells and initial OTDOA assistance data corresponding to the subset of the first plurality of cells;
predicting an expected route to be traveled by the mobile device based at least in part on the first position estimate;
receiving, from the BSA associated with the network server, OTDOA assistance data for a second plurality of cells, the second plurality of cells being proximate to the expected route to be traveled by the mobile device and including at least one cell not included within the first plurality of cells; and
determining a second position estimate based at least in part on second OTDOA assistance data corresponding to a subset of the second plurality of cells.

2. The method of claim 1, wherein the predicting includes detecting Doppler shifts in frequencies of signals received by the mobile device.

3. The method of claim 1, wherein the predicting includes determining the mobile device is traveling on a roadway.

4. The method of claim 3, wherein the predicting further includes extracting route information from a map including the roadway.

5. The method of claim 1, further including selecting the second plurality of cells based upon pattern recognition information including information relating to cells proximate the expected route previously used by the mobile device for generating prior position estimates.

6. The method of claim 5, wherein the pattern recognition information is generated by an artificial intelligence (AI) management module associated with the network server.

7. The method of claim 1, wherein the expected route is predicted by an artificial intelligence (AI) management module associated with the mobile device.

8. A method, comprising:
sending, from a base station almanac (BSA) associated with a network server, observed time difference of arrival (OTDOA) assistance data for a first plurality of cells to a mobile device, the OTDOA assistance data being stored, within a memory of the mobile device, as a first micro-BSA;
receiving, from the mobile device, a first position estimate for the mobile device based on time difference of arrival (TDOA) measurements associated with a subset of the first plurality of cells and initial OTDOA assistance data corresponding to the subset of the first plurality of cells;
predicting an expected route to be traveled by the mobile device based at least in part on the first position estimate;
sending, from the BSA associated with the network server, observed time difference of arrival (OTDOA) assistance data for a second plurality of cells, the second plurality of cells being proximate to the expected route to be traveled by the mobile device and including at least one cell not included within the first plurality of cells; and
receiving, from the mobile device, a second position estimate based at least in part on second OTDOA assistance data corresponding to a subset of the second plurality of cells.

9. The method of claim 8, wherein the predicting includes detecting Doppler shifts in frequencies of signals received by the mobile device.

10. The method of claim 8, wherein the predicting includes determining the mobile device is traveling on a roadway.

11. The method of claim 10, wherein the predicting further includes extracting route information from a map including the roadway.

12. The method of claim 8, further including selecting the second plurality of cells based upon pattern recognition information including information relating to cells proximate the expected route previously used by the mobile device for generating prior position estimates.

13. The method of claim 12, wherein the pattern recognition information is generated by an artificial intelligence (AI) management module associated with the network server.

14. The method of claim 8, wherein the expected route is predicted by an artificial intelligence (AI) management module associated with the network server.

* * * * *